(12) United States Patent
Masuda

(10) Patent No.: US 10,705,276 B2
(45) Date of Patent: Jul. 7, 2020

(54) LIGHTING DEVICE AND DISPLAY DEVICE

(71) Applicant: SHARP KABUSHIKI KAISHA, Sakai, Osaka (JP)

(72) Inventor: Junichi Masuda, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 16/355,671

(22) Filed: Mar. 15, 2019

(65) Prior Publication Data

US 2019/0391316 A1 Dec. 26, 2019

Related U.S. Application Data

(60) Provisional application No. 62/688,630, filed on Jun. 22, 2018.

(51) Int. Cl.
*F21V 7/04* (2006.01)
*F21V 8/00* (2006.01)

(52) U.S. Cl.
CPC ......... *G02B 6/0023* (2013.01); *G02B 6/0068* (2013.01); *G02B 6/0076* (2013.01)

(58) Field of Classification Search
CPC .. G02B 6/0023; G02B 6/0068; G02B 6/0076; G02B 6/0075; G02B 6/002; G02B 6/0051; G02B 6/0055; G02F 2001/133342; G02F 1/133308; G02F 2001/133314; G02F 2001/13332
See application file for complete search history.

(56) References Cited

U.S. PATENT DOCUMENTS

| 10,234,621 | B2* | 3/2019 | Park | G02B 6/0076 |
| 2009/0303744 | A1* | 12/2009 | Iwasaki | G02B 6/0041 |
| | | | | 362/612 |
| 2011/0080754 | A1* | 4/2011 | Wang | G02B 6/0068 |
| | | | | 362/613 |
| 2018/0074249 | A1* | 3/2018 | Hirasawa | F21S 2/00 |

FOREIGN PATENT DOCUMENTS

| CN | 206741156 U | 12/2017 |
| WO | 2016/163176 A1 | 10/2016 |

* cited by examiner

*Primary Examiner* — Matthew J. Peerce
(74) *Attorney, Agent, or Firm* — ScienBiziP, P.C.

(57) ABSTRACT

A lighting device includes light sources having light emission surfaces, a light guide plate having a light entering edge surface, and a light collecting member. The dimension of each light emission surface perpendicular to the extending direction of the light entering edge surface is greater than a thickness of the light guide plate. The light collecting member includes light collecting holes through which the light from the light sources is collected to the light entering edge surface and each of which includes a light source side hole edge section and a light guide plate side hole edge section. The light source side hole edge section is opposite the light source and has an inner area and the light guide plate side hole edge section is opposite the light entering edge surface and has an inner area smaller than the inner area of the light source side hole edge section.

12 Claims, 14 Drawing Sheets

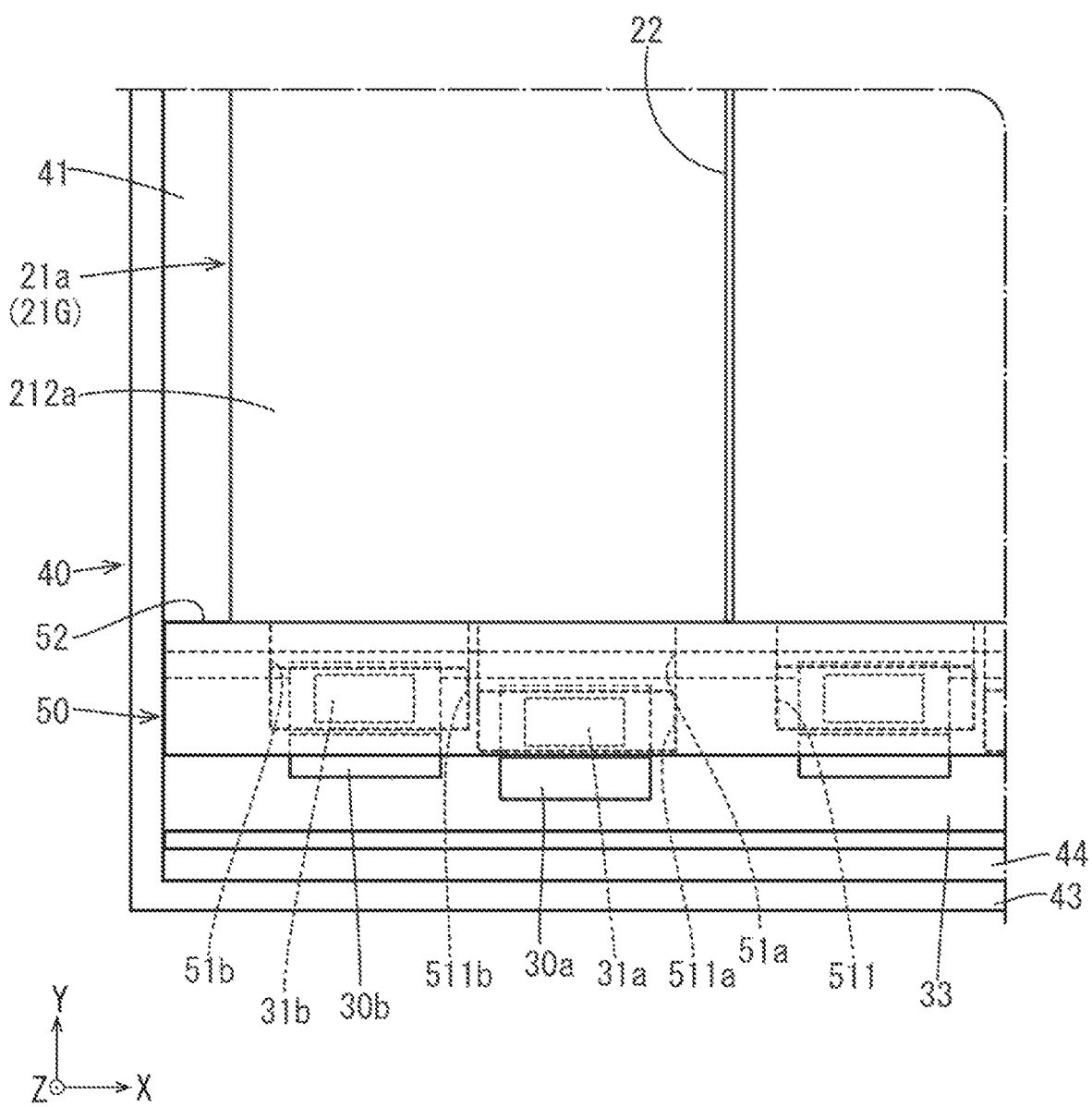

LIGHTING DEVICE AND DISPLAY DEVICE

CROSS REFERENCE TO RELATED APPLICATION

This application claims priority from U.S. Provisional Application No. 62/638,630 filed on Jun. 22, 2018. The entire contents of the priority application are incorporated herein by reference.

TECHNICAL FIELD

The present technology described in this specification relates to a lighting device and a display device.

BACKGROUND ART

A liquid crystal display device including a liquid crystal panel has been used as a display device such as a mobile terminal device and a television device. The liquid crystal panel does not emit light and necessarily uses external light for displaying an image. Therefore, such a type of display device includes a lighting device (so-called backlight unit) other than the liquid crystal panel for supplying light to the liquid crystal panel. Such a lighting device is arranged on a back surface side of the liquid crystal panel and is configured to supply planar light, which spreads in a planar form, to the back surface of the liquid crystal panel.

There have been demands of high contrast of a display image or decrease of power consumption and technology of local dimming has been proposed. In such a local dimming technology, a light emission area is divided into multiple areas and brightness of the backlight unit is controlled for each of the areas. With the local dimming technology, high dynamic range (HDR) display that broadens brightness contrast is performed and high display quality is achieved.

The backlight unit is generally classified into a direct type and an edge light type according to arrangement of a light source. The direct type backlight unit includes the light source directly below a display surface of the liquid crystal panel. The edge light type backlight unit includes the light source beside the liquid crystal panel. The liquid crystal display device has been strongly demanded to be thinner and the edge light type backlight unit is preferably used to achieve further decrease of thickness.

There has been known a backlight unit of the edge light type with the local dimming technology.

SUMMARY

However, in the edge light type backlight unit, the light emission area cannot be divided into small areas because of the arrangement of the light source compared to a direct type one. In the edge light type backlight unit, an area of a light emission surface of the used light source such as an LED is equal to or smaller than an area of an edge surface (a light entering surface) of a light guide plate that is disposed opposite the LED. Therefore, if an LED having high output power and a large light emission area is used to enhance brightness, the light guide plate is increased. In thickness. If a thin light guide plate is used to reduce the thickness, only an LED having a small size and low output power can be used. Namely, high brightness and small thickness are less likely to be achieved at the same time.

An object of the technology disclosed in this specification is to provide a lighting device and a display device that have reduced thickness and high brightness.

The technology disclosed in this specification is a lighting device including light sources having light emission surfaces through which light is emitted and each of the light emission surfaces having a dimension, a light guide plate having outer peripheral edge surfaces, and a light collecting member between the light sources and the light entering edge surface. The light guide plate has a light entering edge surface through which the light from the light sources enters and the light entering edge surface is a part of the outer peripheral edge surfaces and extends in an extending direction, and the dimension of each of the light emission surfaces is perpendicular to the extending direction of the light entering edge surface and the dimension is greater than a thickness dimension of the light guide plate. The light collecting member includes light collecting holes through which the light emitted by the light sources is collected to the light entering edge surface of the light guide plate. Each of the light collecting holes includes a pair of hole edge sections including a light source side hole edge section and a light guide plate side hole edge section. The light source side hole edge section is opposite each of the light sources and having an inner area and the light guide plate side hole edge section is opposite the light entering edge surface and has an inner area that is smaller than the inner area of the light source side hole edge section.

According to the above configuration, in a configuration including a large-sized light sources having large output power, small thickness of the light guide plate can be maintained regardless of the size of the light emission surface of the light source because the light emitted by the light source is collected by the light collecting member and enters the light guide plate effectively. Accordingly, the whole lighting device except for the sections including the light sources, that is, the whole display device is reduced in thickness and design of the device can be improved.

BRIEF DESCRIPTION OF THE DRAWINGS

FIG. 6 is an enlarged plan view of a part of FIG. 1.

DETAILED DESCRIPTION

First Embodiment

Figure 1:
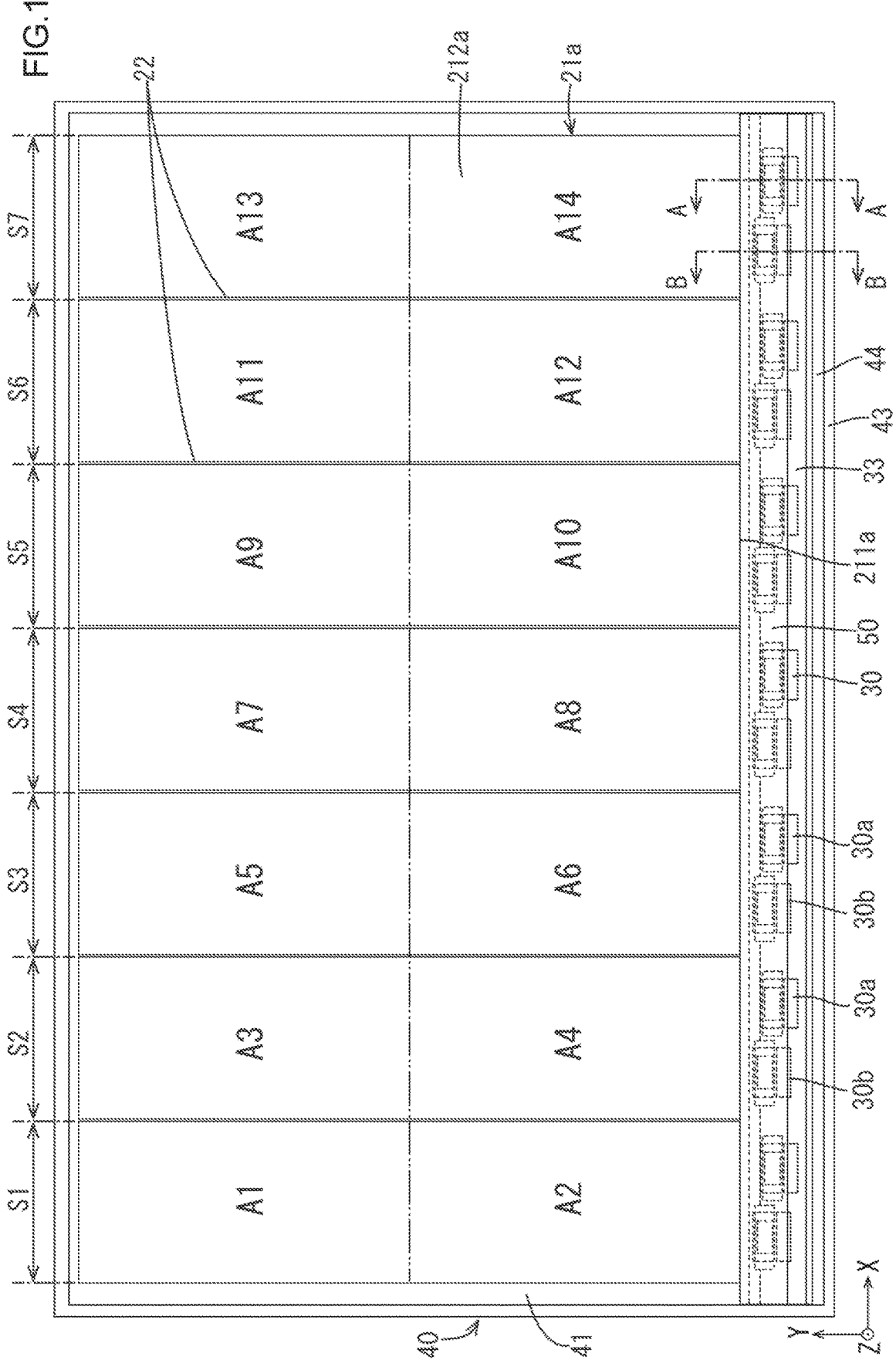
FIG. 1 is a plan view of a backlight unit without including a frame according to a first embodiment.

A first embodiment will be described with reference to FIGS. 1 to 6. In the present embodiment, a liquid crystal display device (a display device) 10 including a liquid crystal panel 11 as a display panel will be described. X-axis, Y-axis and Z-axis may be indicated in each of the drawings. The axes in each drawing correspond to the respective axes in other drawings. A vertical direction is illustrated with reference to FIG. 3 and an upper side and a lower side correspond to a front side and a back side, respectively. A left side in FIG. 3 corresponds to a front side. One of the same components is provided with a symbol and other components may not be provided with the symbol.

The liquid crystal display device 10 has a rectangular flat box shape as a whole and includes a liquid crystal panel (an example of a display panel) 11 and a backlight unit (an example of a lighting device) 20. The liquid crystal panel 11 is configured to display images. The backlight unit 20 is arranged on a back side of the liquid crystal panel 11 and supplies light for display to the liquid crystal panel 11. The liquid crystal panel 11 and the backlight unit 20 are integrally held by a frame-shaped bezel 15. The liquid crystal display device 10 may be preferably used in a television receiver, a PC monitor, and other devices.

Details of the liquid crystal panel 11 will not illustrated. The liquid crystal panel 11 has a known configuration and includes a pair of rectangular substrates that are bonded to each other while having a predetermined gap therebetween and a liquid crystal layer between the substrates. Each of the substrates includes a glass substrate having high transmissivity such as non-alkaline glass and fused quartz and includes multiple films layered on each glass substrate with the known photolithography method.

One of the pair of the substrates on the rear (on a lower side in FIG. 3) is an array substrate and switching components (such as TFTs), pixel electrodes, and an alignment film and other films are arranged are arranged on the array substrate. The switching components are connected to source lines and gate lines that are perpendicular to each other. The pixel electrodes are connected to the switching components. The other one of the substrates on the front (on an upper side in FIG. 3) is a CF substrate. Color filters, a counter electrode, and an alignment film are arranged on the CF substrate. The color filters include color portions of red (R), green (G), and blue (B) that are arranged with predetermined alignment. The source lines, the gate lines, and the counter electrode are supplied with image and various kinds of control signals data that are necessary for displaying images from a control circuit board. Polarizing plates are bonded to outer surfaces of the substrates, respectively.

The liquid crystal panel 11 displays images thereon with using light supplied by the backlight unit 20 and a front side thereof is a light exit side. A long-side direction, a short-side direction and a thickness direction of the liquid crystal panel 11 match the X-axis direction, the Y-axis direction and the Z-axis direction, respectively.

Figure 3:
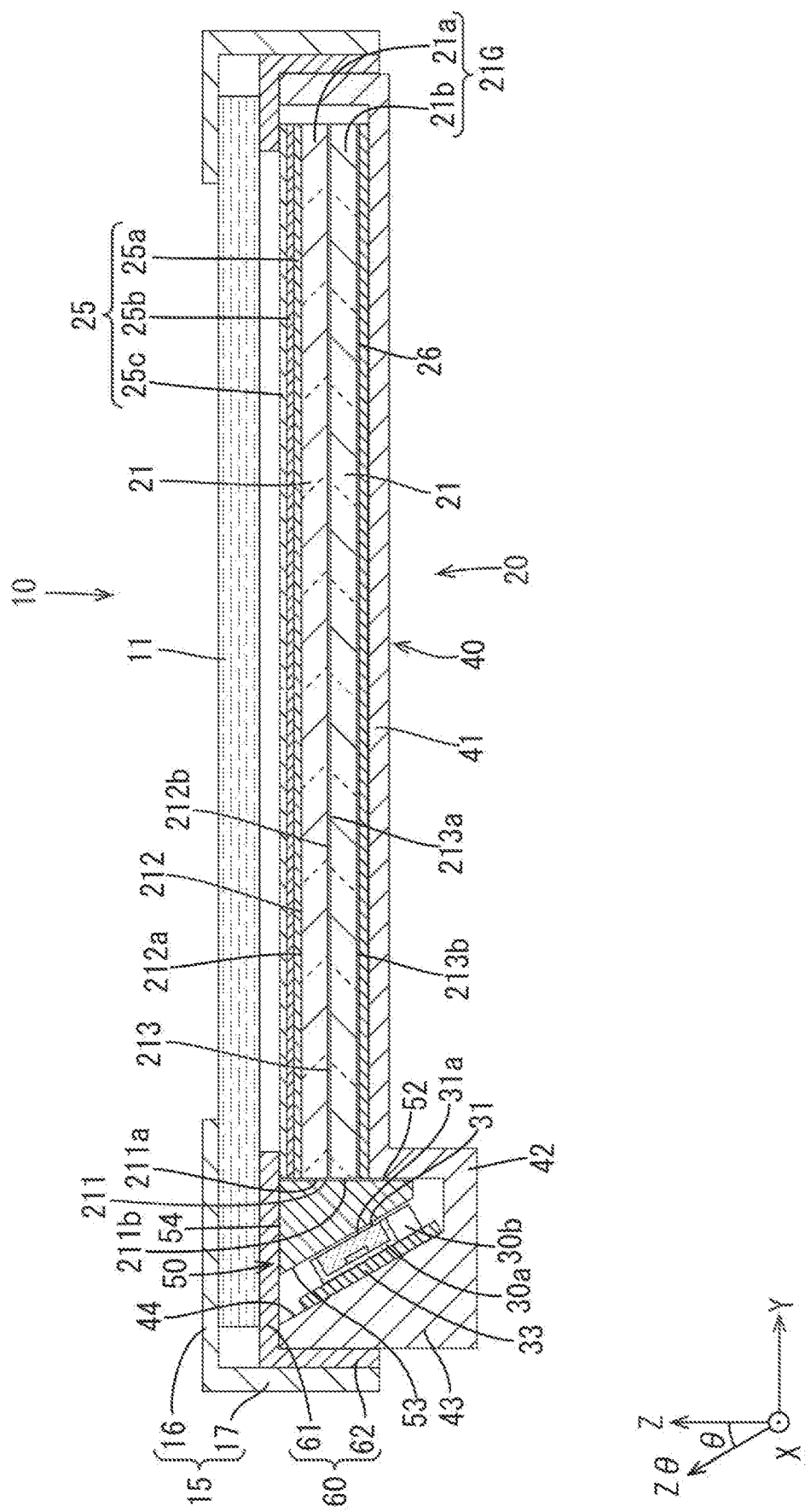
FIG. 3 is a side cross-sectional view of a liquid crystal display device.

The bezel 15 is made of metal material (such as aluminum) and has a rectangular frame shape as a whole. As illustrated in FIG. 3, the bezel 15 includes a panel pressing section 16 and an outer frame section 17. The panel pressing section 16 presses an outer peripheral edge section of the liquid crystal panel 11 over an entire periphery thereof from the front side. The outer frame section 17 projects from an outer peripheral edge of the panel pressing section 16 toward the back side and surrounds the backlight unit 20 (a tubular section 62 of a frame 60, which will be described later) from the outer peripheral side. The liquid crystal panel 11 is sandwiched and held by the bezel 15 and the backlight unit 20.

The backlight unit 20 has substantially a block-like shape having a laterally elongated rectangular planar shape as a whole similar to the liquid crystal panel 11. The backlight unit 20 includes an LED board 33, a light guide plate group 21G, an optical sheet 25, a reflection sheet 26, a light collecting member 50, a chassis 40, and the frame 60. Multiple light emitting diodes 30 (LEDs), which are a light source, are mounted on the LED board 33. Light that is emitted by the LEDs 30 are guided through the light guide plate group 21G. The optical sheet 25 is disposed on a front surface side of the light guide plate group 21G. The reflection sheet 26 is disposed on a back surface side of the light guide plate group 21G. The light that is emitted by the LEDs 30 is directed toward the light guide plate group 21G by the light collecting member 50.

Figure 2:
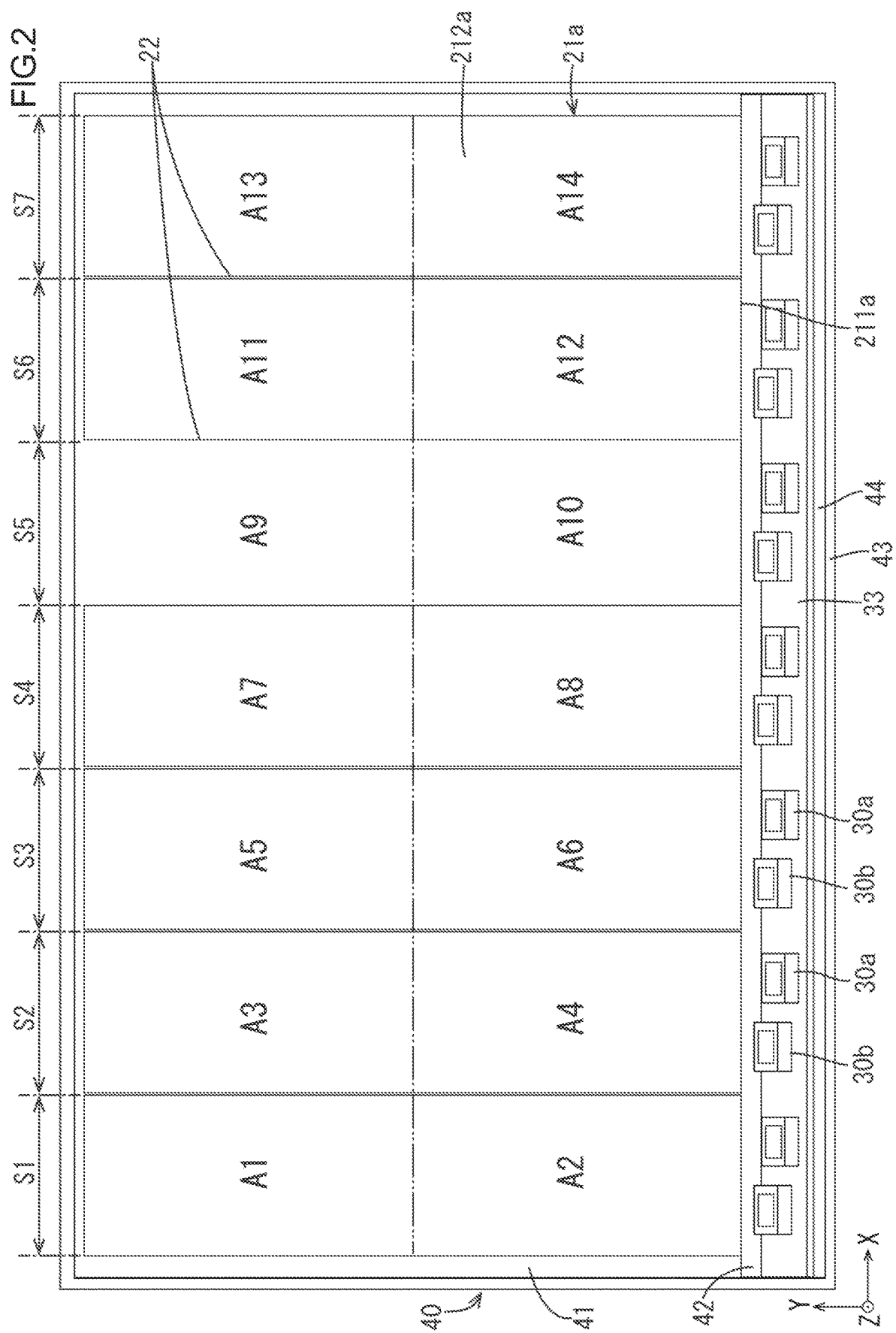
FIG. 2 is a plan view of the backlight unit, without including the frame and a light collecting member.

As illustrated in FIGS. 1 to 3, the backlight unit 20 is an edge light type (a side-light type) backlight unit of one-side light entering type in which light from the LEDs 30 enters the light guide plate group 21G through one long-side edge surface thereof. In the backlight unit 20, the light from the LEDs 30 is converted by the light guide plate group 21G into planar light and the converted light exits through an open section of the chassis 40 toward the liquid crystal panel 11 on the front side. Namely, the front side of the backlight unit 20 is a light exit side. Hereinafter, components of the backlight unit 20 will be described sequentially.

First, the light guide plate group 21G will fee described. The light guide plate group 21G of this embodiment includes two light guide plates 21. The light guide plates 21 include a first light guide plate 21a that is disposed on a relatively front side and a second light guide plate 21b that is disposed on a relatively back side. The first light guide plate 21a and the second light guide plate 21b are rectangular plates of the same shape and the same size and are overlapped with each other in a plan view over entire areas thereof. As illustrated in FIGS. 1 to 3, the light guide plate group 21G is arranged such that the long side direction, the short side direction, and the thickness direction thereof match the X-axis, the Y-axis, and the Z-axis, respectively.

Hereinafter, each light guide plate 21 is described separately by adding an alphabet of "a" or "b" like the first light guide plate 21a or the second light guide plate 21b and the numeral is not provided with any alphabet to generally describe the light guide plate 21. A configuration of each of the light guide plates 21*a*, 21*b* is described separately by adding the alphabet of "a" or "b" to the numeral and the numeral is not provided with any alphabet to generally describe the configuration.

The light guide plate 21 is made of material that has refractive index sufficiently higher than that of air and has high transmissivity. The material may be resin such as transparent acryl or polycarbonate or various kinds of glass. In the present embodiment, two acrylic resin plates are used as the first light guide plate 21*a* and the second light guide plate 21*b*.

The first light guide plate 21*a* is disposed above and overlapped with the second light guide plate 21*b* and disposed on a front side of the second light guide plate 21*b* with respect to the Z-axis direction while having a space therebetween. The first light guide plate 21*a* has outer peripheral edge surfaces and one of the outer peripheral edge surfaces disposed on a left side in FIG. 3 and extending in the X-axis direction is a first light entering edge surface 211*a* through which the light emitted by the LEDs 30 enters. The first light entering edge surface 211*a* is vertical to a front side plate surface (a first light exit plate surface 212*a*, which will be described later) of the first light guide plate 21*a* and extends along an X-Z surface.

The first light guide plate 21*a* has a pair of front and back plate surfaces and a front side plate surface (facing the liquid crystal panel 11) is a first light exit plate surface 212*a* through which the light exits toward the liquid crystal panel 11. A back side plate surface is a first light exit opposite plate surface 213*a* that is opposite from the first light exit plate surface 212*a*.

The second light guide plate 21*b* is disposed below and overlapped with the first light guide plate 21*a* and disposed on a back side of the first light guide plate 21*a* with respect to the Z-axis direction while having a space therebetween. The second light guide plate 21*b* has outer peripheral edge surfaces and one of the outer peripheral edge surfaces disposed on a left side in FIG. 3 and extending in the X-axis direction is a second light entering edge surface 211*b* through which the light emitted by the LEDs 30 enters. The first light entering edge surface 211*a* and the second light entering edge surface 211*b* are overlapped with each other. Namely, the light guide plates 21 are overlapped with each other such that the respective light entering edge surfaces 211 face in the same direction. Accordingly, the LEDs 30 are collectively arranged on one side of the light guide plate group 21G. The second light entering edge surface 211*b* is vertical to a front side plate surface (a second light exit plate surface 212*b*, which will be described later) of the second light guide plate 21*b* and extends along the X-Z surface.

The second light guide plate 21*b* has a pair of front and back plate surfaces and a front side plate surface is a second light exit plate surface 212*b* through which the light exits toward the first light guide plate 21*a* and the liquid crystal panel 11. A back side plate surface is a second light exit opposite plate surface 213*b* that Is opposite from the second light exit plate surface 212*b*. The second light exit plate surface 212*b* is covered with the first light guide plate 21*a* over an entire area thereof.

According to such a configuration, light enters each of the light guide plates 21 through each light entering edge surface 211 and travels within the light guide plates 21. After that, the light is directed in the Z-axis direction and exits through each of the light exit plate surfaces 212 toward the front side (the liquid crystal panel 11 side).

Accordingly, the light guide plates 21 of the present embodiment are arranged such that the arrangement direction of the light entering edge surfaces 211 through which the light from the LEDs 30 enters matches the X-axis, the light entering direction matches the Y-axis, and the light exit direction matches the Z-axis.

As illustrated in FIGS. 1 and 2, each of the first light guide plate 21*a* and the second light guide plate 21*b* has a groove (an elongated structure) 22 on each of the light exit plate surfaces 212*a* and 212*b* for every pair of the LEDs 30 (a pair of LEDs 30 includes a first LED 30*a* and a second LED 30*b* next to the first LED 30*a* and a position between a pair of LEDs and another pair of LEDs) sequentially from the edge. The groove 22 extends in the Y-axis direction. The groove 22 has a V-shaped cross-sectional view and functions as a prism that changes a direction of light, that reaches the groove. As illustrated in FIGS. 1 and 2, the light exit plate surface 212 is divided into seven regions in the X-axis direction by the grooves 22 and includes belt-like divided areas S1 to S7 each extending along the Y-axis. The groove 22 is formed such that the light that has travelled within one divided area S is less likely to disperse to another divided area S that is adjacent to the one divided area S. Namely, the groove 22 exerts a closing effect. The groove 22 may be formed at least near a border between the divided areas S and may be formed in another region than the border region.

The light exit opposite plate surface 213 has an uneven pattern including lens projections projecting toward the back side in a predetermined region, which will be described later. The uneven pattern exerts a function of outputting the light that has travelled within the light guide plate 21 toward an outer side (the light exit plate surface 212 side). The light exit opposite plate surface 213 does not necessarily include the uneven pattern and may be subjected to screen printing with white scattered ink or may have recesses or scratches made with laser to output the light toward the outside.

In the present embodiment, as illustrated in FIGS. 1 and 2, the light exit opposite plate surface 213 is divided into two with respect to the Y-axis direction. The first light guide plate 21*a* has a first uneven pattern in an upper region (A1+2n) (farther from the first light entering edge surface 211*a*) of the first light exit opposite plate surface 213*a* in the drawings. The second light guide plate 21*b* has a second uneven pattern in a lower region (A2+2n) of the second light exit opposite plate surface 213*b* in the drawings (n is an integer number of zero or greater).

Accordingly, each of the light exit plate surfaces 212*a*, 212*b* is divided into seven sections in the X-axis direction and into two sections in the Y-axis direction according to combination of the grooves 22 and the uneven patterns. The light guide plate group 21G includes fourteen regions A1 to A14. The fourteen regions A1 to A14 have a same area.

As illustrated in FIG. 3, the light guide plate group 21G having such a configuration is disposed directly below the liquid crystal panel 11 while having the optical sheets 25 therebetween.

The optical sheets 25 disposed on the light exit plate surface 212*a* of the first light guide plate 21*a* are flat rectangular sheets having a same size as that of the first light guide plate 21*a*. The long-side direction of the optical sheets 25 matches the X-axis direction, and the short-side direction matches the Y-axis direction. The optical sheets 25 are disposed between the first light guide plate 21*a* and the liquid crystal panel 11. The light that has exited the light guide plate group 21G passes through the optical sheets 25 and exits the optical sheets 25 toward the liquid crystal panel 11 while the optical sheets 25 adding predetermined optical effects on the transmission light. The optical sheets 25 may not have a same size as that of the first light guide plate 21*a* but may be a sheet member having a greater area than that of at least a light emission area of the light guide plate 21a.

The optical sheets 25 of the present embodiment have a three-layered structure and include a diffuser sheet 25a, a lens sheet 25b, and a reflective-type polarizing sheet 25c that are stacked on each other from a lower layer side in this order. The types or the number of layers of the optical sheets are not limited to those of the present embodiment but various kinds of optical sheets may be used.

The second light guide plate 21b has the reflection sheet 26 on the rear surface side (on a light exit opposite plate surface 213b side) thereof. The reflection sheet 26 is a flat rectangular sheet having a same size as that of the first light guide plate 21a. The long-side direction of the reflection sheet 26 matches the X-axis direction, and the short-side direction matches the Y-axis direction. The reflection sheet 26 is disposed between the second light guide plate 21b and a bottom plate section of the chassis 40, which will be described later. The reflection sheet 26 is a sheet made of synthetic resin and having a white surface of high light reflectivity. Therefore, the light that has travelled within the second light guide plate 21b and exited through the light exit opposite plate surface 213b is effectively directed toward the front side (toward the light exit plate surface 212b). The reflection sheet 26 may not have a same size as that of the second light guide plate 21b but may be a sheet member having a greater area than that of at least a light emission area of the light guide plate 21b.

The above-described light guide plate group 21G and other components are arranged in the chassis 40. The chassis 40 is, for example, made of metal material such as an aluminum plate and an electrogalvanized steel plate (SECC). The chassis 40 has a rectangular plan view shape and a shallow box shape opening frontward. The light guide plate group 21G and an LED board 33, and a light collecting member 50, which will be described later, are arranged in the chassis 40.

Figure 4A:
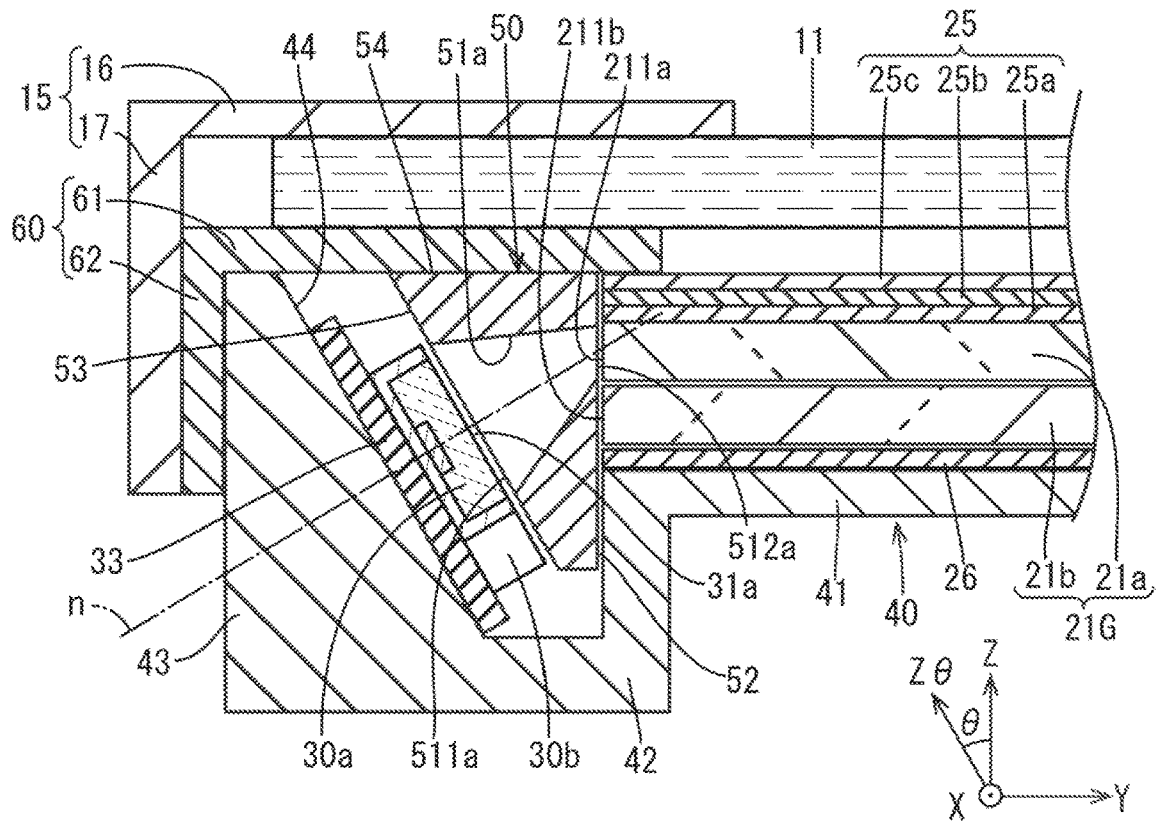
FIG. 4A is an enlarged side cross-sectional view of a part of the liquid crystal display device taken along line A-A in FIG. 1.
Figure 4B:
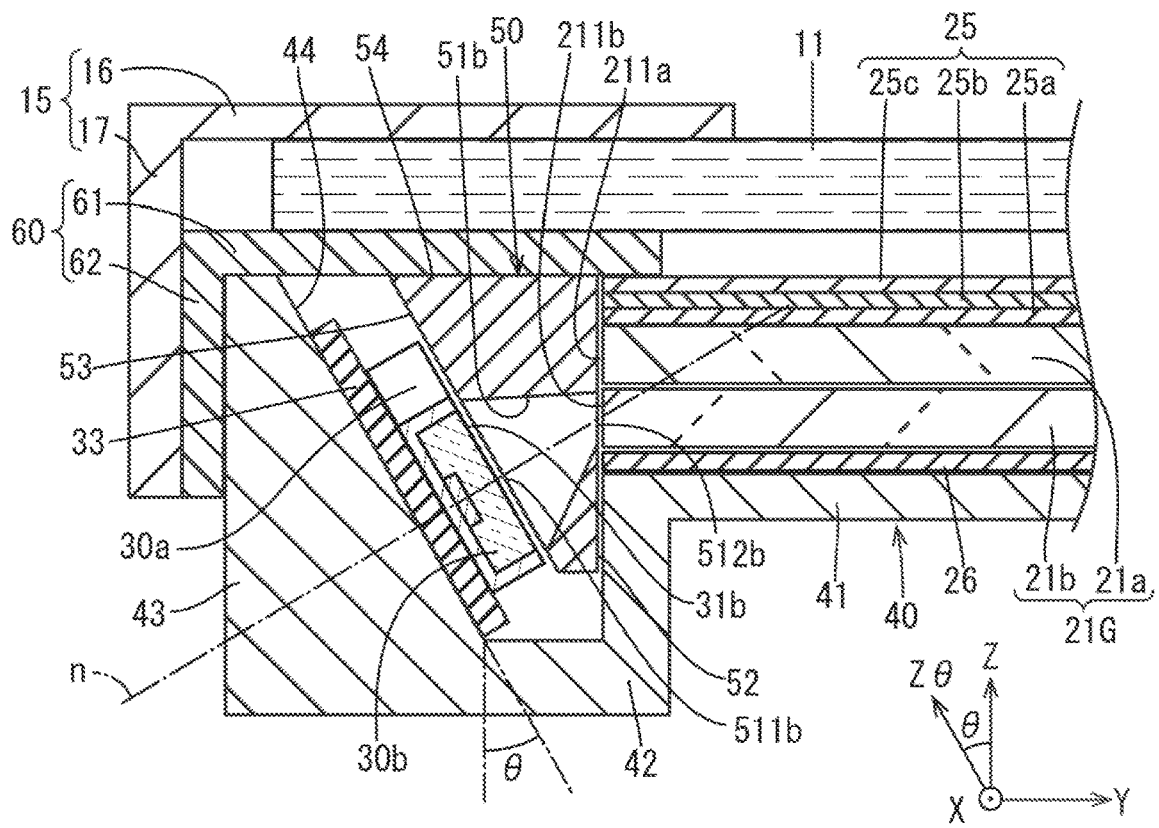
FIG. 4B is an enlarged side cross-sectional view of a part of the liquid crystal display device taken along line B-B in FIG. 1.

The chassis 40 includes a rectangular bottom plate section 41, a recessed section 42, and a frame-shaped side wall 43. The light guide plate 21 is arranged on the bottom plate section 41. The recessed section 42 is a recessed at a long-side section of the bottom plate section 41 and extends along the long side in a belt-like shape. An LED board 33 and a light collecting member 50, which will be described later, are arranged in the recessed section 42. The side wall 43 extends from outer edge sections of the bottom plate section 41 and the recessed section 42 toward the front side. As illustrated in FIG. 4B, for example, the side wall 43 extending from one long-side section of the recessed section 42 has a surface that is opposite the light entering edge surface 211 of the light guide plate group 21G. The surface is inclined from the thickness direction of the light guide plate 21 at an angle θ with respect to the light entering edge surface 211 such that opening of the chassis 40 increases toward the open side. The surface is an LED board mount surface 44. The angle range of the angle θ is not particularly limited but may be preferably within a range of 0°<θ≤90° and more preferably within a range of 30°≤θ≤60°. The LED board 33, which will be described later, is fixed on the LED board mount surface 44 with a fixing tape.

The bottom plate section 41 supports components arranged within the chassis 40 from the back side. The LED board 33 is supported by the LED board mount surface 44 of the recessed section 42 from the back surface thereof. The side wall 43 has a frame shape having a rectangular plan view shape as a whole and surrounds the components arranged within the chassis 40 from an outer peripheral side thereof.

In the chassis 40, the long-side direction and the short-side direction of the bottom plate section 41 and the recessed section 42 match the X-axis direction and the Y-axis direction, respectively, and a plate thickness direction that is perpendicular to a plate surface of the bottom plate section 41 matches the Z-axis direction. The LED board mount surface 44 is inclined at the angle θ with respect to the light entering edge surface 211 so as to be widely open toward the opening of the chassis 40 in the thickness direction of the light guide plate 21. Hereinafter, an inclined direction in which the surface is inclined from the Z-axis direction with respect to the light entering edge surface 211 (a X-Z surface) is referred to as a Zθ direction.

A frame 60 is disposed at the opening or the chassis 40. As illustrated in FIG. 3, the frame 60 includes a laterally elongated frame section 61 and the tubular section 62. The frame section 61 presses the outer peripheral edge sections of the light, guide plate group 21G and the optical sheets 25 over an entire periphery from the front side. The tubular section 62 projects from the outer peripheral edge section of the frame section 61 toward the back side and surrounds the side wall 43 of the chassis 40 from the outer peripheral side. The outer frame section 17 of the bezel 15 is fit outside the tubular section 62.

Next, the LEDs 30 and the LED board 33 will be described. The LED 30 has an LED chip that is a light emission source and is included in a box-shaped casing and sealed with a sealing material. The LED chip has a single main light emission wavelength and emits a single color of blue, for example. The LED chip is connected to wiring on the LED board 33 and outside the casing via a lead frame that extends through a wall of the casing. The sealing material sealing the LED chip contains phosphors in a dispersed state. The phosphor is excited by blue light, emitted by the LED chip and emits light of a predetermined color. The LED emits white light as a whole. The LED 30 has a light emission surface 31 facing an opposite side from the LED board 33 side and is a so-called top-view type LED (a top surface light emission type, an upper surface light emission type).

The LED 30 emits light through the quadrangular light emission surface 31 such that the light spreads with certain directivity with respect to an optical axis as a center axis. In this embodiment, the optical axis of the emitted light is substantially vertical to a middle section of the light emission surface 31.

A largest amount of the light rays emitted by the LED 30 through the light emission surface 31 travels along a line vertical to the light emission surface 31. Thus, the LED 30 that is the top-view type LED has a greater light emission amount compared to the LED of a side-view type (a side surface light emission type) in which the light emission surface is next to a mounting surface to be mounted on the LED board and is preferable for enhancing brightness.

The LED board 33 includes a base film made of thermosetting resin such as urethane resin and epoxy resin and wiring for supplying power to the LEDs 30. The wiring is formed on the base film. The LED board 33 further includes a thermoplastic resin layer having a thermoplastic property, such as polyimide resin, on the base film and the LEDs 30 on the thermoplastic resin layer. The LEDs 30 are arranged regularly as will be described later.

The LED board 33 has a thin elongated belt-like shape and has a long-side dimension greater than an extending dimension of the light entering edge surface 211 of the light guide plate 21. The LED board 33 extends along the light entering edge surface 211 of the light guide plate 21. As described before, a surface of the LED board 33 opposite from the mounting surface is fixed to the LED board mount surface 44 of the chassis 40 with the fixing tape. Namely, the long-side direction and the short-side direction of the LED board 33 match the X-axis direction and the Zθ direction, respectively.

As illustrated in FIG. 4B, for example, the top-view type LED 30 fixed on the LED board 33 has the light emission surface 31 that is inclined from the thickness direction of the light guide plate 21 at the angle θ with respect to the light entering edge surface 211. Arrangement positions of the LED board 33 and the LEDs 30 are set such that a line n extending from a center of the light emission surface 31 vertically to the light emission surface 31 matches a center of the light; entering edge surface 211 of the light guide plate 21 where the light is to enter with respect to the thickness direction.

The light emission surface 31 of the LED 30 has a dimension along the short-side direction of the LED board 33 or a dimension in a direction perpendicular to the extending direction of the light entering edge surface 211 and such a dimension is greater than a thickness dimension of the light guide plate 21. A dimension of the light emission surface 31 of the LED 30 that is projected on the light entering edge surface 211 with respect to the thickness direction of the light guide plate 21 is greater than the thickness dimension of the light guide plate 21.

Figure 5A:
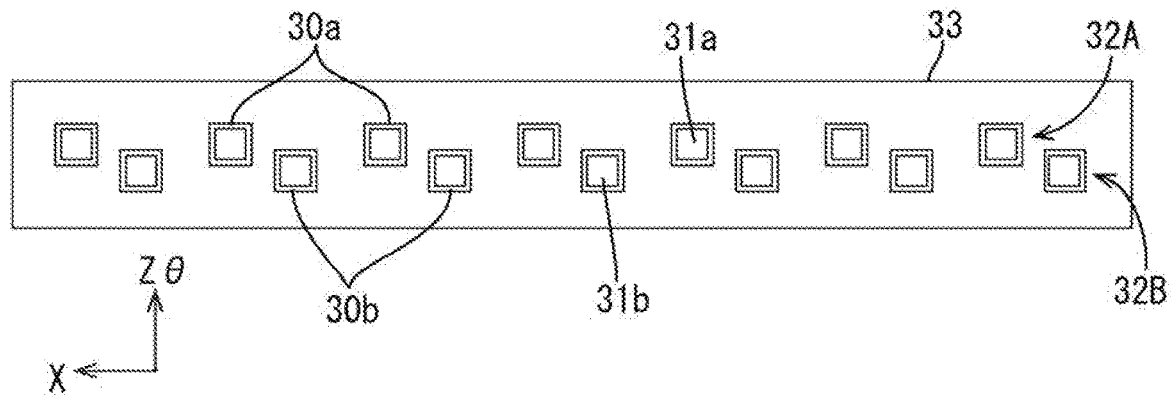
FIG. 5A is a plan view of a LED board.

As illustrated in FIG. 5A, the LEDs 30 are arranged in two rows along two lines that are shifted from each other from a middle of the LED board 33, which is formed in a belt shape, with respect to the short-side direction. The two lines are along an axis that is perpendicular to the short-side direction of the LED board 33. The LEDs 30 are arranged in a staggered manner repeatedly with respect to the long-side direction of the LED board 33 or the extending direction of the light entering edge surface 211. Hereinafter, the LEDs 30 on one of the two rows (on an upper side in FIG. 5A) are referred to as first LEDs 30a and a row of the first LEDs 30a is referred to as a first LED row 32A. The LEDs 30 on another one of the two rows (on a lower side in FIG. 5A) are referred to as second LEDs 30b and a row of the second LEDs 30b is referred to as a second LED row 32B.

The first LEDs 30a of the first LED row 32A and the second LEDs 30b of the second LED row 32B are arranged alternately and repeatedly at intervals in the extending direction of the light entering edge surface 211 such that each of mounting areas does not overlap. On the other hand, in the direction perpendicular to the extending direction of the light entering edge surface 211 and along the light emission surface 31, the mounting areas of the first LED 30a and the second LED 30b that are adjacent to each other partially overlap. Namely, in FIG. 5A, a lower edge of the first LED 30a and an upper edge of the second LED 30b overlap each other in the Zθ direction. According to such arrangement, the LED board 33 is reduced in size of the short-side dimension. Pairs of the first LED 30a and the second LED 30b that are adjacent to each other are arranged closer to each other sequentially from an end of the LED board 33.

The backlight unit 20 of the present embodiment includes the light collecting member 50. As illustrated in FIGS. 1 and 3, the light collecting member 50 has a substantially triangular columnar shape extending along the light entering edge surface 211 of the light guide plate 21. The light collecting member 50 has one side surface extending along a column axis thereof as an LED opposite surface 53 and another side surface as a light guide plate opposite surface 52. The LED opposite surface 53 is parallel to and opposite the light emission surfaces 31 of the LEDs 30. The light guide plate opposite surface 52 is parallel to and opposite the light entering edge surfaces 211 of the light guide plate group 21G. Namely, the LED opposite surface 53 is a X-Zθ surface and the light guide plate opposite surface 52 is a X-Z surface. The other side surface is a connecting surface 54 that is a X-Y surface along the plate surface of the light guide plate 21.

The connecting surface 54 of the light collecting member 50 is fixed on a lower surface of the frame section 61 of the frame 60 via a fixing tape.

The light collecting member 50 includes light collecting holes 51 through which the light rays emitted by the LEDs 30 are reflected and collected toward each of the light entering edge surfaces 211 of the light guide plate group 21G. Specifically, a half of the light collecting holes 51 are first light collecting holes 51a and other half are second light, collecting holes 51b (see FIGS. 4A and 4B). The light emitted by the first LEDs 30a of the first LED row 32A is collected through the first light collecting holes 51a to the first light entering edge surface 211a of the first light guide plate 21a. The light emitted by the second LEDs 30b of the second LED row 32B is collected through the second light collecting holes 51b to the second light entering edge surface 211b of the second light guide plate 21b.

Hereinafter, a configuration of each of the light collecting holes 51 is described separately by adding the alphabet of "a" or "b" to the numeral and the numeral is not provided with any alphabet to generally describe the configuration.

An inner surface of the light collecting hole 51 has a color having good light reflectivity such as white or silver. Such a hole having an inner surface of good light reflectivity is formed by disposing an aluminum film on the inner, surface of the hole with deposition or plating or making the light collecting member from metal. The light emitted by the LEDs 30 is reflected and collected by the inner wall of the light collecting hole 51 and exits through the hole in the light guide plate opposite surface 52 (a light guide plate side hole edge section 512) toward the light guide plate 21 effectively.

Among the pair of hole edge sections of each light collecting hole 51, a LED side hole edge section 511 (an example of a light source side hole edge section) formed on the LED opposite surface 53 is opposite the LED 30 as illustrated in FIG. 6. The LED side hole edge section 511 has a substantially square shape that is slightly larger than the light emission surface 31 and surrounds an outer periphery of the quadrangular light emission surface 431 of each LED 30.

Among the pair of hole edge sections, a light guide plate side hole edge section 512 formed on the light guide plate opposite surface 52 is opposite the light entering edge surface 211. The light guide plate side hole edge section 512 has a laterally elongated rectangular shape such that a vertical dimension and a lateral dimension of the whole hole edge section are inside the edge sections of the light entering edge surface 211 of the light guide plate 21 with respect to the vertical direction and the lateral direction (see FIG. 5B). Specifically, as illustrated in FIGS. 4A and 43, the light guide plate side hole edge section 512 has a dimension in the thickness direction of the light guide plate 21 that is equal to or slightly smaller than a dimension of the light entering edge surface 211 in the same direction and decreases its hole size from the LED side hole edge section 511. According to such a configuration, light emitted by one LED 30 through the light emission surface 31 thereof does not enter a different light guide plate 21. Therefore, quality of local dimming is improved. On the other hand, as illustrated in FIG. 6, dimensions with respect to the extending direction of the light entering edge surface 211 are similar to that of the LED side hole edge section 511. Namely, a width dimension of one light, collecting hole 51 is constant (a same dimension) from the LSD side hole edge section 511 to the light guide plate side hole edge section 512. That is, the width dimension is slightly greater than a width dimension of the light emission surface 31 of one LED 30.

According to such a configuration, the light guide plate side hole edge section 512 has a hole area or an inner area that is smaller than that of the LED side hole edge section 511. Namely, the light passing through the light collecting hole 51 is reflected by an inner surface of the light collecting hole 51 and collected to have great intensity and exit through the light collecting hole 51 toward the light entering edge surface 211 of the light guide plate 21.

The light collecting hole 51 is described as above and arrangement of the hole edge sections of the light collecting holes 51 will be described next.

The LED side hole edge section 511 of the pair of hole edge sections of the light collecting hole 51 surrounds the outer periphery of each light emission surface 31 of the first LED 30a and the second LED 30b, as described before. Namely, the LED side hole edge sections 511 are arranged such that the LEDs 30 illustrated in FIG. 5A are arranged in a reflected manner. Specifically, each first LED side hole edge section 511a and each second LED side hole edge section 511b are arranged alternately and repeatedly in a staggered manner at intervals in the extending direction of the light entering edge surface 211 such that the forming areas thereof do not overlap each other. On the other hand, with respect to the direction perpendicular to the extending direction of the light entering edge surface 211 and with respect to the direction along the light emission surface 31, forming areas of the first LED side hole edge section 511a and the second LED side hole edge section 511b that are adjacent to each other partially overlap (see FIG. 6).

Figure 5B:
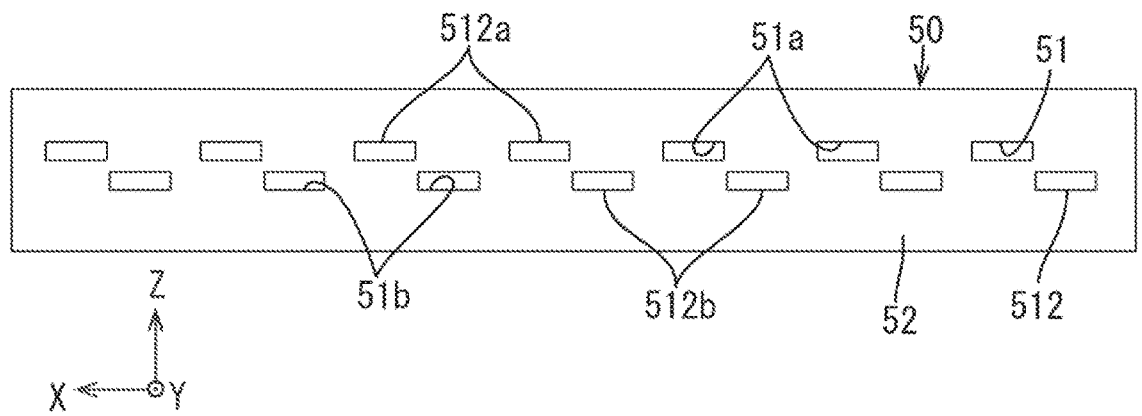
FIG. 5B is a front view of the light collecting member.
Figure 5C:
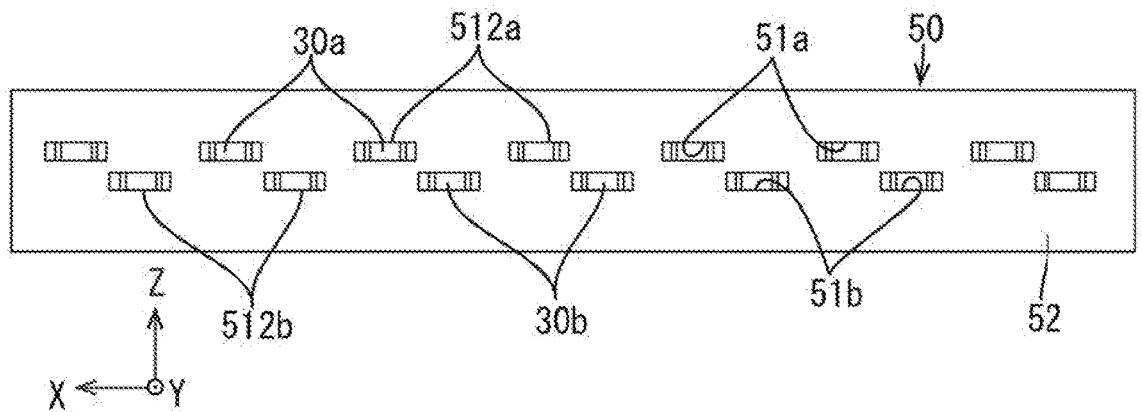
FIG. 5C is a front view of the light collecting member that is disposed on the LED board.

On the other hand, as illustrated in FIG. 5B, in the light guide plate side hole edge section 512 of the pair of hole edge sections, the first light guide plate side hole edge section 512a and the second light guide plate side hole edge section 512b that are adjacent to each other do not overlap in the thickness direction of the light guide plate 21 and are arranged in middle sections of the respective first light entering edge surface 211a and the second light, entering edge surface 211b with respect to the thickness direction of the light guide plate 21. In the extending direction of the light entering edge surface 211, similar to the LED side hole edge section 511, the first light guide plate side hole edge section 512a and the second light guide plate side hole edge section 512b are arranged alternately and repeatedly at intervals such that the forming areas thereof do not overlap each other.

According to such a configuration, the first light collecting hole 51a and the second light collecting hole 51b that are adjacent to each other do not overlap in the extending direction of the light entering edge surface 211. Namely, the first light collecting hole 51a and the second light, collecting hole 51b are defined independently from each other and light does not travel between spaces of the holes (see FIG. 5).

Further, according to such a configuration, if the LED board 33 is mounted on the LED board mount surface 44 such that the light collecting member 50 is arranged in a correct position with respect to the LED board 33 and the light guide plate group 21G, the line n extending from a center of the light emission surface 31 of the LED 30 vertically to the light, emission surface 31 of the LED 30 passes through a center of the light collecting hole 51 (refer FIGS. 4A and 4B). Accordingly, the light emitted by the LED 30 effectively enters the light guide plate 21.

The liquid crystal display device 10 of the present embodiment has the above described configuration and operations and effects will be described next.

The backlight unit 20 of the present embodiment includes the LEDs 30 having the light emission surfaces 31 through which light emits, and the light guide plate 21 having the light entering edge surface 211 through which the light from the LEDs 30 enters. The light emission surface 31 has a dimension extending in the 29 dimension perpendicular to the extending direction (the X-axis direction) of the light entering edge surface 211 and the dimension is greater than a thickness dimension (the Z-axis dimension) of the light guide plate 21. The light collecting member 50 is between the LEDs 30 and the light entering edge surface 211 and includes the light collecting holes 51 through which the light emitted by the LEDs 30 is collected to the light entering edge surface 211 of the light guide plate 21. Among the pair of the hole edge sections of the light collecting hole 51, the light guide plate side hole edge section 512 has a hole area or an inner area that is smaller than that of the LED side hole edge section 511 that is opposite the LED 30.

According to the above configuration, in a configuration including a large-sized LEDs 30 having large output power, small thickness of the light guide plate 21 can be maintained regardless of the size of the light emission surface 31 of the LED 30 because the light emitted by the LED 30 is collected by the light collecting member 50 and enters the light guide plate 21 effectively. Accordingly, the whole backlight unit 20 except for the sections including the LEDs 30, that is, the whole liquid crystal display device 10 is reduced in thickness and design of the device can be improved.

The light guide plate side hole edge section 512 is opposite and inside the edge section of the light entering edge surface 211. According to such a configuration, the light emitted by the LEDs 30 toward the light guide plate 21 is less likely to leak through a space near the plate surface of the light guide plate 21 and the light use efficiency is improved.

The LED side hole edge section 511 is opposite the LED 30 to surround each light emission surface 31. According to such a configuration, a greater amount of the light rays emitted by the LED 30 through the light emission surface 31 enters the light collecting member 50 through the light collecting holes 51.

The LED 30 is arranged such that the light emission surface 31 thereof is inclined at the angle θ with respect to the thickness direction of the light guide plate 21. Therefore, compared to a configuration that the light emission surface 31 is parallel to the thickness direction of the light, guide plate 21, the sections of the backlight unit 20 or the liquid crystal display device 10 including the LEDs 30 are reduced in thickness.

The LEDs 30 and the light guide plate 21 are arranged such that the line n extending from a center of the light emission surface 31 vertically to the light emission surface 31 matches a center of the light guide plate 21 with respect; to the thickness direction. According to such a configuration, the light, emitted by the LED 30 effectively enters the light guide plate 21.

The backlight unit 20 includes the light guide plate group 21G including two light guide plates 21 (the first light guide plate 21a and the second light guide plate 21b) that are overlapped with each other in the thickness direction of each light guide plate 21. The light guide plate group 21G is arranged such that the light emitting edge surfaces 211a, 211b of the light guide plates 21a, 21b face the same direction. According to such a configuration, the local dimming is performed and the first LED 30a and the second LED 30b for the respective light guide plates 21a, 21b are arranged to face the same direction with respect to the light guide plate group 21G and the configuration is simplified.

The LEDs 30 include the first LED row 32A and the second LED row 32B corresponding to the light entering edge surfaces 211a and 211b, respectively, such that light enters the light guide plates 21a, 21b through the light entering edge surfaces 211a, 211b, respectively. Furthermore, the first LED row 32A and the second LED row 32B are mounted on the LED board 33. According to such a configuration, compared to a configuration including the LEDs 30 arranged in one row for the light guide plate group 21G or a configuration including the LED boards 33 respectively for the light guide plates 21a, 21b, the configuration of the backlight unit 20 can be simplified.

The first LEDs 30a included in the first LED row 32A and the second LEDs 30b that are included in the second LED row 32B and are adjacent to the first LEDs 30a are arranged alternately and repeatedly in a staggered manner in the extending direction of the light entering edge surface 211. According to such a configuration, the LEDs 30 are arranged in positions such that the light entering efficiency is increased with respect to each of the first light guide plate 21a and the second light guide plate 21b.

The first LED 30a of the first LED row 32A and the second LED 30b that is included in the second LED row 32B and is adjacent to the first LED 30a are arranged such that, each of the mounting areas does not overlap in the extending direction of the light entering edge surface 211. In the direction perpendicular to the extending direction of the light entering edge surface 211 and along the light emission surface 31, the mounting areas of the first LED 30a and the second LED 30b that are adjacent to each other partially overlap. According to such arrangement, the LED board 33 is reduced in size of the short-side dimension.

The light collecting holes 51 corresponding to the respective LEDs 30 included in the first LED row 32A and the second LED row 32B are included in the light collecting member 50. According to such a configuration, the configuration can be simplified compared to a configuration including the light collecting members 50 for the respective LEDs.

Furthermore, each of the collecting holes 51 has a same dimension from the LED side hole edge section 511 to the light guide plate side hole edge section 512 in the extending direction of the light entering edge surface 211, According to such a configuration, the light can enter the light guide plate 21 effectively compared to a configuration that the dimension of the light collecting hole 51 in the extending direction is increased toward the light guide plate 21.

According to the present embodiment, the large-size LED 30 can be used while reducing a thickness of the light: guide plate 21. Therefore, two-dimensional local dimming can be performed and the backlight unit 20 and the liquid crystal, display device 10 with high brightness can be obtained.

Second Embodiment

Next, a second embodiment will be described with reference to FIGS. 7 and 8. A backlight unit 120 and a liquid crystal display device 110 according to the present embodiment differ from the first embodiment in that a light guide plate group 121G includes three light guide plates 21. Accordingly, the number of the LED rows is three. Hereinafter, configurations that are different from those of the first embodiment will be described and configurations same as those of the first embodiment are provided with the same symbols and will not be described.

The light guide plate group 121G includes three light guide plates 21 including the first light guide plate 21a arranged on a relatively front side, the second light guide plate 21b arranged on a front side of the first light guide plate 21a, and a third light guide plate 21c arranged on a back side of the second light guide plate 21b. The first to third light guide plates 21a, 21b, 21c are rectangular plate members having the same shape and the same size and are overlapped over entire areas thereof in a plan view.

The first light guide plate 21a is disposed on the second light guide plate 21b and the second light guide plate 21b is disposed on the third light guide plate 21c in the Z-axis direction while having a space therebetween, respectively. Each of the light guide plates 21 includes outer edge surfaces and an edge surface of the outer edge surfaces that is on a left side in FIG. 7 and extends in the X-axis direction is the light entering edge surface 211 through which light emitted by the LED 30 enters. The light entering edge surfaces 211 are vertical to a front-side plate surface of each light guide plate 21 (a light exit plate surface 212, which will be described later) and along an X-Z surface.

Each of the light guide plates 21 includes a front and back plate surfaces. A plate surface facing the front side (the liquid crystal panel 11 side) is the light exit plate surface 212 through which the light exits toward the liquid crystal panel 11 and a plate surface facing the back side is the light exit opposite plate surface 213 that is opposite from the light exit plate surface 212. The second light exit plate surface 212b is covered with the first light guide plate 21a over an entire area thereof. The third light exit plate surface 212c is covered with the second light guide plate 21b over an entire area thereof.

According to such a configuration, the light enters each of the light guide plates 21 through each light entering edge surface 211 and travels within the light guide plate 21. Thereafter, the light is directed in the Z-axis direction and exits through each light exit plate surface 212 toward the front side (the liquid crystal panel 11 side).

Each of the light guide plates 21 includes the grooves (a groove structure) 22 on each light exit plate surface 212. The grooves 22 extend in the Y-axis direction and are sequentially formed from an edge of the light exit plate surface 212 while having every three LEDs 30 therebetween. The light exit plate surface 212 is divided into five regions by the grooves 22 in the X-axis direction and includes five belt-like divided areas each extending along the Y-axis.

The light exit, opposite plate surface 213 has an uneven pattern in a predetermined area. The light that has travelled within the light guide plate 21 exits through the uneven pattern toward an outer side (the light exit plate surface 212 side). In the present embodiment, the light exit opposite plate surface 213 is divided into three sections with respect to the Y-axis direction. The first light guide plate 21a has a first uneven pattern in the section of the first light exit opposite plate surface 213a far from the first light entering edge surface 211a. The second light guide plate 21b has a second uneven pattern in a middle section of the second light exit opposite plate surface 213b. The third light guide plate 21c has a third uneven pattern in the section of the third light exit opposite plate surface 213c close to the first light entering edge surface 211c.

As described before, each of the light exit plate surfaces 212a, 212b, 212c is divided into five sections in the X-axis direction and three sections in the Y-axis direction according to combinations of the grooves 22 and the uneven patterns Thus, fifteen regions are formed in the light guide plate group 121G. All of the fifteen regions have a same area.

Figure 7:
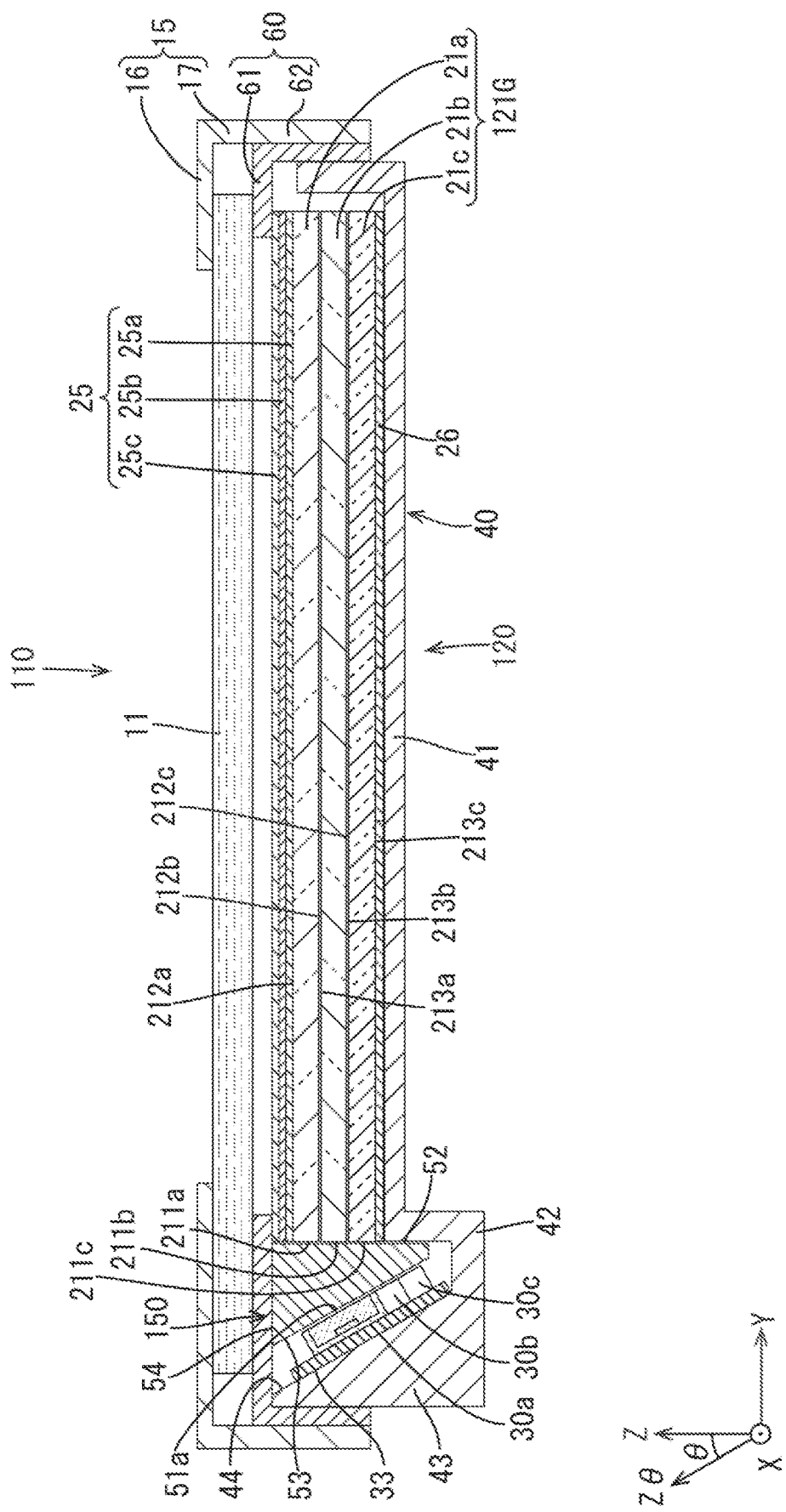
FIG. 7 is a side cross-sectional view of a liquid crystal display device according to a second embodiment.

As illustrated in FIG. 7, the light guide plate group 121BG having the above configuration is arranged directly below the liquid crystal panel 11 while having the optical sheets therebetween. The reflection sheet 26 is disposed on the back-surface side (the light exit opposite plate surface 213c side) of the third light guide plate 21c.

Figure 8A:
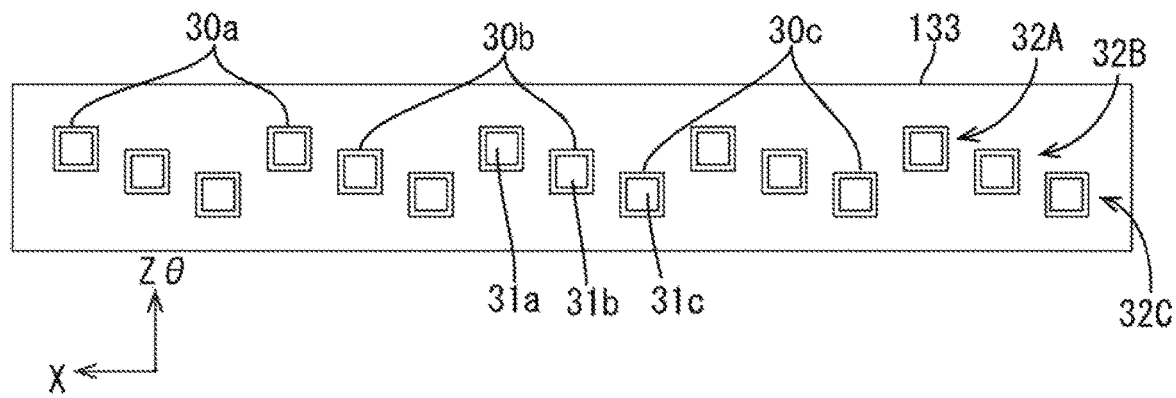
FIG. 8A is a plan view of an LED board.

As illustrated in FIG. 8A, the LEDs 30 are arranged in three rows along three lines that are shifted from each other evenly. The three lines includes a line along a middle of the LED board 133, which is formed in a belt shape, with respect to the short-side direction and two lines shifted from the middle evenly toward the two edges of the LED board 133 with respect to an axis that is perpendicular to the short-side direction of the LED board 133. The LEDs 30 are arranged in a staggered manner with respect to the long-side direction of the LED board 133 or the extending direction of the light entering edge surface 211. Every three LEDs 30 are repeatedly arranged in the above manner. Hereinafter, the LEDs 30 arranged in the three rows are referred to as the first LEDs 30a, the second LEDs 30b, and third LEDs 80c from the upper side. A row of the first LEDs 30a is referred to as the first LED row 32A, a row of the second LEDs 30b is referred to as the second LED row 32B, and a row of the third LEDs 30c is referred to as a third LED row 32C.

The first LEDs 30a of the first LED row 32A, the second LEDs 30b of the second LED row 32B, and the third LEDs 30c of the third LED row 32c are arranged in a staggered manner in the short-side direction of the LED board 133 repeatedly and arranged at intervals in the extending direction of the light entering edge surface 211 such that each of mounting areas does not overlap. On the other hand, in the short-side direction of the LED board 133 or the direction perpendicular to the light entering edge surface 211 and along the light, emission surface 31, the mounting areas of the first LED 30a and the second LED 30b that are adjacent to each other and the mounting areas of the second LED 30b and the third LED 30c that are adjacent to each other partially overlap. Namely, in FIG. 8A, a lower edge of the mounting area of the first LED 30a and an upper edge of the mounting area of the second LED 30b overlap in the Zθ direction, and a lower edge of the mounting area of the second LED 30b and an upper edge of the mounting area of the third LED 30c overlap in the Zθ direction. According to such arrangement, the LED board 133 is reduced in size of the short-side dimension.

In the present embodiment, one third of all of the light collecting holes 51 included in the light collecting member 150 are first light collecting holes 51a through which the light emitted by each of the first LEDs 30a of the first LED row 32A is collected toward the first light entering edge surface 211a of the first light guide plate 21a. Another one third thereof (a half of the rest) are second light collecting holes 51b through which the light emitted by the second LEDs 30b of the second LED row 32B is collected toward the second light entering edge surface 211b of the second light guide plate 21b. The other one third thereof are third light collecting holes 51c through which the light emitted by the third LEDs 30c of the third LED row 32C is collected toward the third light entering edge surface 211c of the third light guide plate 21c.

The light collecting holes 51 have a same form as that of the light collecting holes 51 of the first embodiment. The one light collecting hole 51 decreases its dimension with respect to the width direction of the light guide plate 21 from the LED side hole edge section 511 to the light guide plate side hole edge section 512. The one light collecting hole 51 has a dimension in the extending direction of the light entering edge surface 211 that is constant (a same dimension) from the LED side hole edge section 511 to the light guide plate side hole edge section 512.

Regarding the arrangement of the light collecting holes 51, the LED side hole edge sections 511 of the light collecting holes 51 are arranged such that the LEDs 30 illustrated in FIG. 8A are arranged in a reflected manner. Specifically, the first to third LED side hole edge sections 511a, 511b, 511c are arranged repeatedly in a staggered manner in the short-side direction of the LED board 133 and arranged at intervals in the extending direction of the light entering edge surface 211 such that the forming areas do not overlap each other. On the other hand, with respect to the direction perpendicular to the extending direction of the light entering edge surface 211 and with respect to the direction along the light emission surface 31, the forming areas of the first LED side hole edge section 511a and the second LED side hole edge section 511b that are adjacent to each other and the forming areas of the second LED side hole edge section 511b and the third LED side hole edge section 511c that are adjacent to each other partially overlap.

Figure 8B:
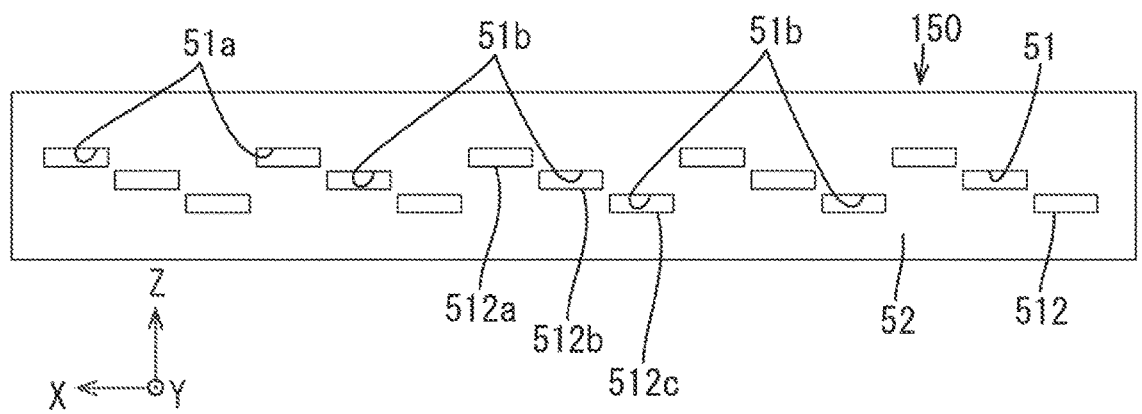
FIG. 8B is a front view of a light collecting member.
Figure 8C:
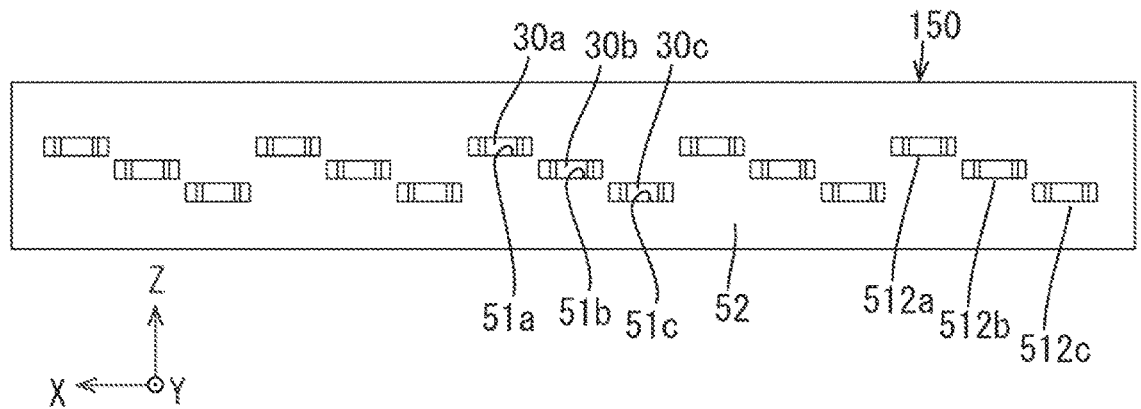
FIG. 8C is a front view of the light collecting member that is disposed on the LED board.

On the other hand, as illustrated in FIG. 8B, in the light guide plate side hole edge section 512 of the pair of hole edge sections 512, the first light guide plate side hole edge section 512a and the second light guide plate side hole edge section 512b that are adjacent to each other and the second light guide plate side hole edge section 512b and the third light guide plate side hole edge section 512c that are adjacent to each other do not overlap in the thickness direction of the light guide plate 21 and are arranged in middle sections of the respective first to third light entering edge surfaces 211a, 211b, 211c with respect to the thickness direction of the light guide plate 21. In the extending direction of the light entering edge surface 211, similar to the LED side hole edge section 511, the first to third light guide plate side hole edge sections 512a, 512b, 512c are arranged in a staggered manner repeatedly at intervals such that the forming areas thereof do not overlap each other.

According to the backlight unit 120 and the liquid crystal display device 110 of the present embodiment, in addition to the advantageous effects of the above embodiment, the number of division of the local dimming is increased and display quality of the backlight unit 120 and the liquid crystal display device 110 is further improved.

Third Embodiment

Figure 9A:
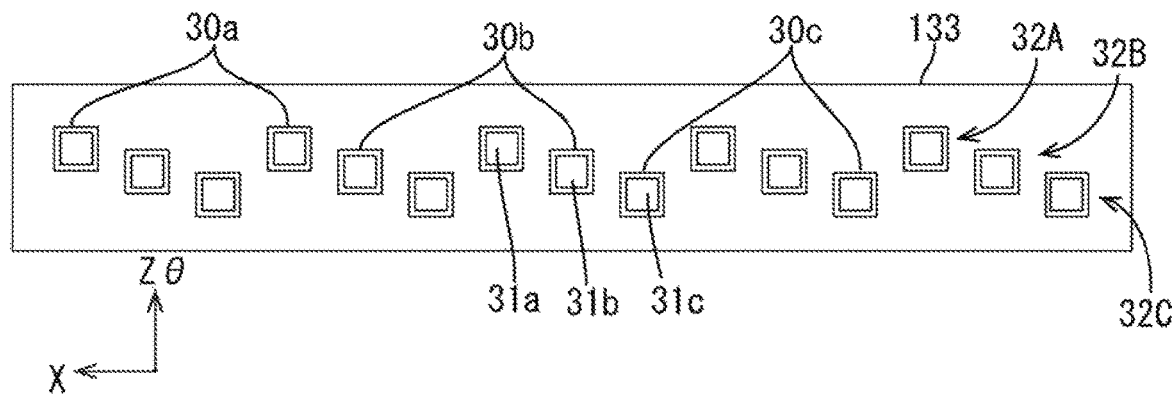
FIG. 9A is a plan view of an LED board.
Figure 9B:
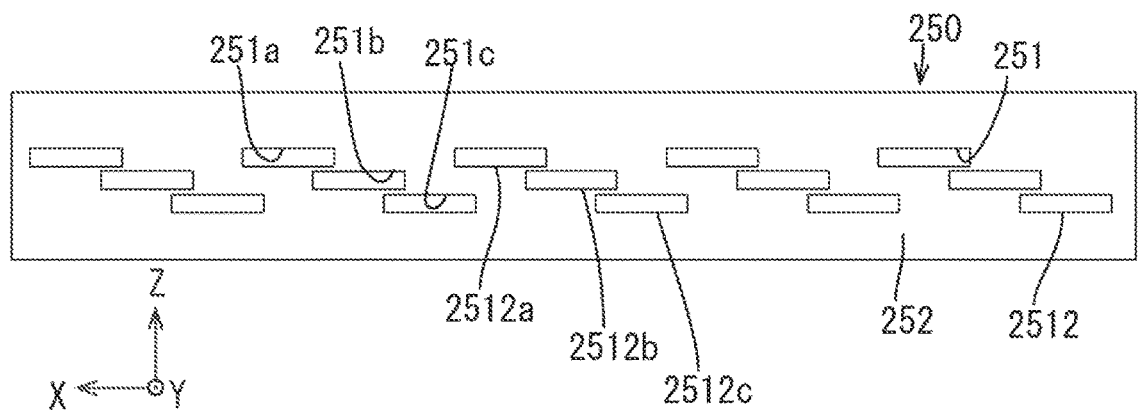
FIG. 9B is a front view of a light collecting member according to a third embodiment.
Figure 9C:
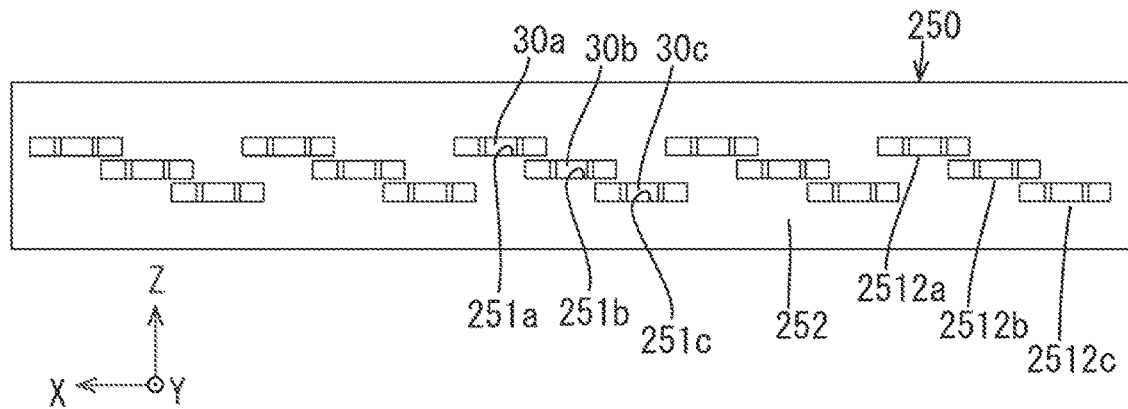
FIG. 9C is a front view of the light collecting member that is disposed on the LED board.

A third embodiment will be described with reference to FIGS. 9 and 10. A backlight unit and a liquid crystal display device of the present embodiment includes a configuration modified from that of the light collecting holes 51 of the light collecting member 150 included in the backlight unit 120 of the second embodiment. Hereinafter, configurations that are different from those of the second embodiment will be described and configurations same as those of the second embodiment are provided with the same symbols and will not be described.

Light collecting holes 251 included in a light collecting member 250 of the present embodiment have a same configuration. One light collecting hole 251 decreases its hole size from a LED side hole edge section 2511 to a light guide plate side hole edge section 2512 in the thickness direction of the light guide plate 21 similar to the light collecting hole 51 of the above embodiments. On the other hand, the configuration differs from that of the second embodiment in that the hole size increases from the LED side hole edge section 2511 toward the light guide plate side hole edge section 2512 in the extending direction of the light entering edge surface 211.

Specifically, among the pair of hole edge sections of each light collecting hole 251, the LED side hole edge section 2511 formed on the LED opposite surface has a substantially square shape that is slightly greater than the light emission surface 31 so as to surround the outer periphery of the light emission surface 31 of each LED 30 having a quadrangular shape. The one LED side hole edge section 2511 is opposite the LED 30.

Among the pair of hole edge sections, the light guide plate side hole edge section 2512 formed in a light guide plate opposite surface 252 has a dimension in the thickness direction of the light guide plate 21 that is smaller than the dimension of the light entering edge surface 211 in the same direction (the thickness dimension of the light guide plate 21). The one light guide plate side hole edge section 2512 is disposed inside the edge section of the light entering edge surface 211. Such a configuration is same as that of the above embodiments. However, the one light guide plate side hole edge section 2512 has a dimension in the extending direction of the light entering edge surface 211 that Is greater than the dimension of the LED side hole edge section 2511 in the same direction. The present embodiment differs from the above embodiment in that, the one light guide plate side hole edge section 2512 increases its hole size from the LED side hole edge section 2511 (refer FIG. 10). However, the light guide plate side hole edge section 2512 has a hole area or an inner area that is smaller than that of the LED side hole edge section 2511.

Figure 10:
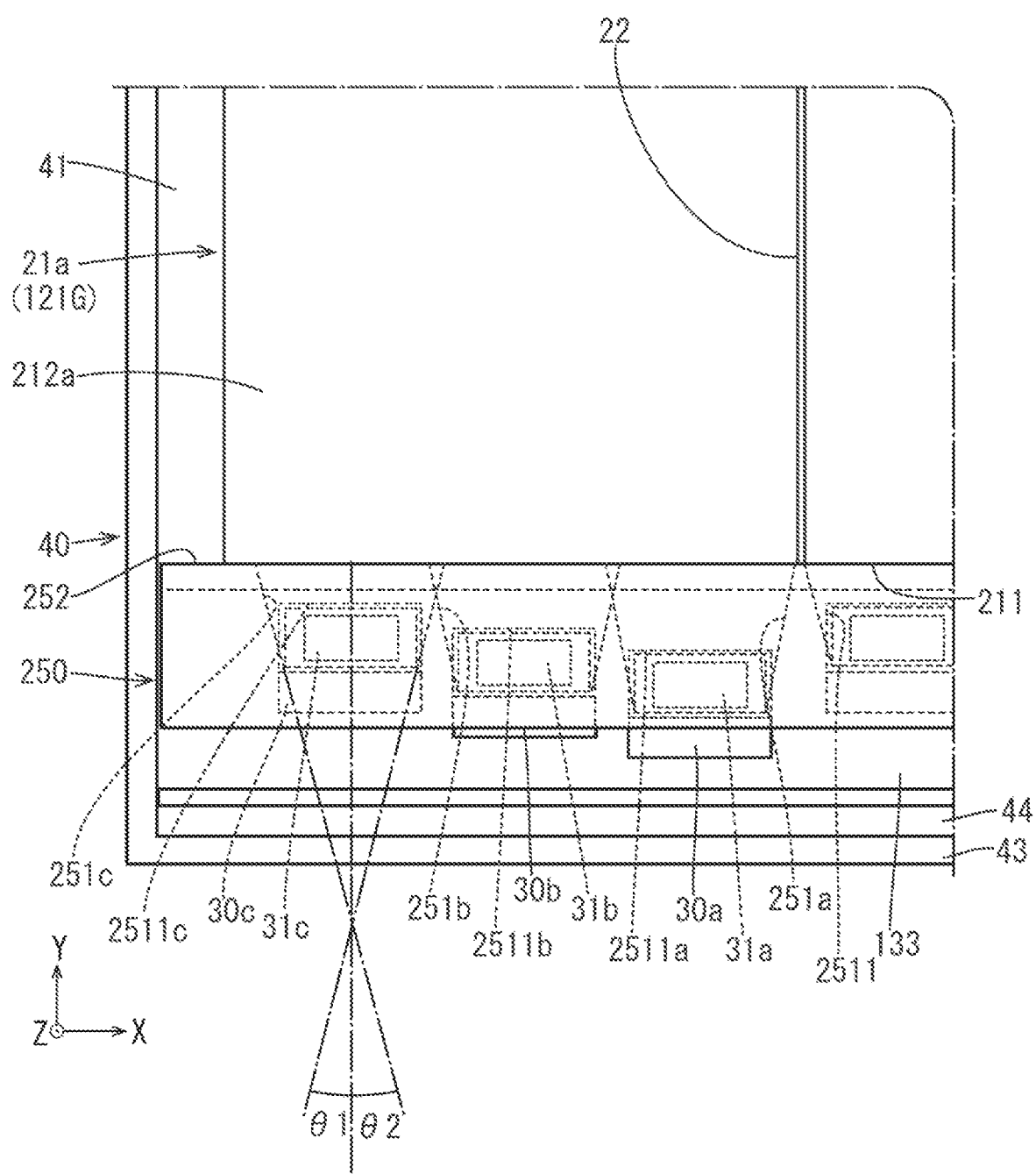
FIG. 10 is an enlarged plan view of a part of a backlight unit.

As illustrated in FIG. 10, the light guide plate side hole edge section 2512 increases its hole size from the LED side hole edge section 2511 at a same angle ($\theta 1 = \theta 2$) with respect to the extending direction of the light entering edge surface 211.

In the present embodiment, the arrangement of the LEDs 30 is same as that of the second embodiment. Accordingly, the first light guide plate side hole edge section 2512a corresponding to the first LED row 32A partially overlaps the adjacent second light guide plate side hole edge section 2512b corresponding to the second LED row 32B with respect to the extending direction of the light entering edge surface 211. Further, the second light guide plate side hole edge section 2512b corresponding to the second LED row 32B partially overlaps the adjacent third light guide plate side hole edge section 2512c corresponding to the third LED row 32C with respect to the extending direction of the light entering edge surface 211. Furthermore, the third light guide plate side hole edge section 2512c corresponding to the third LED row 32C partially overlaps the first light guide plate side hole edge section 2512a corresponding to the first LED row 32A with respect to the extending direction of the light entering edge surface 211 (refer FIGS. 9B and 9C).

However, the hole size increase angle (($\theta 1$ and $\theta 2$) is set such that the adjacent light collecting holes 251 included in the LED row 32 do not overlap each other in the extending direction of the light entering edge surface 211. Namely, the adjacent light collecting holes 251 included in the LED row 32 are defined independently from each other and light does not cross over spaces of the adjacent light collecting holes 251.

According to the backlight unit and the liquid crystal display device of the present embodiment, the light emitted by the LEDs 30 of each LED row 32 enters the light guide plate 21 through the light entering edge surface 211 over a large area. Therefore, no space is provided or a small space is provided between the adjacent LEDs 30 included in the adjacent LED rows 32 (between the adjacent light guide plate side hole edge sections 2512), and light unevenness is less likely to be caused in the backlight unit. Accordingly, display quality of; the liquid crystal display device is improved and power consumption is reduced.

Fourth Embodiment

Figure 11A:
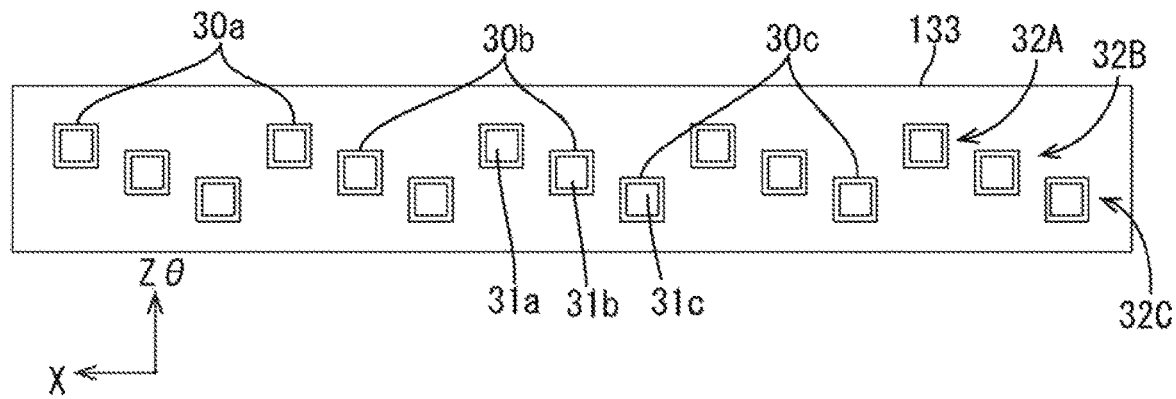
FIG. 11A is a plan view of an LED board.
Figure 11B:
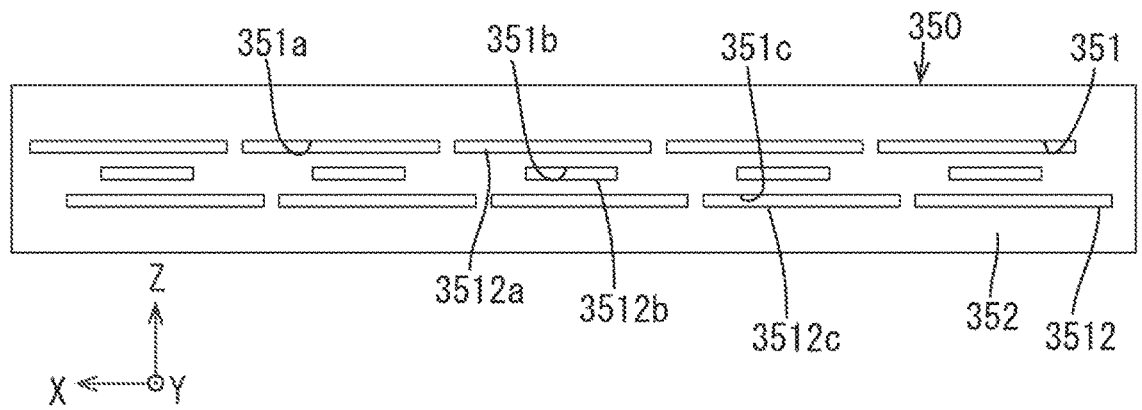
FIG. 11B is a front view of a light collecting member according to a fourth embodiment.

A fourth embodiment will be described with reference to FIGS. 11 and 12. A backlight unit and a liquid crystal display device of the present embodiment includes a configuration that is different from that of the third embodiment and modified from the second embodiment in that the light collecting holes 51 of the light collecting member 150 included in the backlight unit 120 are modified. Hereinafter, configurations that; are different from those of the second embodiment will be described and configurations same as those of the second embodiment are provided with the same symbols and will not be described.

In light collecting holes 351 included in a light collecting member 350 of the present embodiment, first light collecting holes 351a and third light collecting holes 351c corresponding to the first LED row 32A and the third LED row 32C, respectively have a similar configuration. Second light collecting holes 351b corresponding to the second LED row 32B have a configuration different from that of the first light collecting holes 351a and the third collecting holes 351c.

One LED side hole edge section 3511 of the pair of hole edge sections of each light collecting hole 351 that is formed on the LED opposite surface has a substantially square shape that is slightly greater than the light emission surface 31 to surround the outer periphery of a quadrangular light emission surface 31 of each LED 30. The LED side hole edge section 3511 is opposite the LED 30. The LED side hole edge sections 3511 of all of the first to third light collecting holes 351a, 351b, 251c have a same shape and are formed in the LED opposite surface of the light collecting member 350 such that the LEDs 30 are arranged in a reflected manner.

On the other hand, in the extending direction of the light entering edge surface 211, the light guide plate side hole edge section 3512 has a dimension greater than that of the LED side hole edge section 3511 in the same direction and increases its hole size from the LED side hole edge section 3511. Hereinafter, the light guide plate side hole edge section 3512 will be described in detail.

First, the third light collecting hole 351c will be descried. As illustrated in FIG. 12, the third light collecting hole 351c increases its hole size from the third LED side hole edge section 3511c to the third light guide plate side hole edge section 3512c at uneven angles with respect to the extending direction of the light entering edge surface 211. Specifically, the third light guide plate side hole edge section 3512c increases its hole diameter toward the second LED 30b of the adjacent second LED row 32B at a hole size increase angle greater than that on the opposite side (the first LED 30a side or the edge side of the LED board 133) ($\theta 3 > \theta 4$).

Figure 11C:
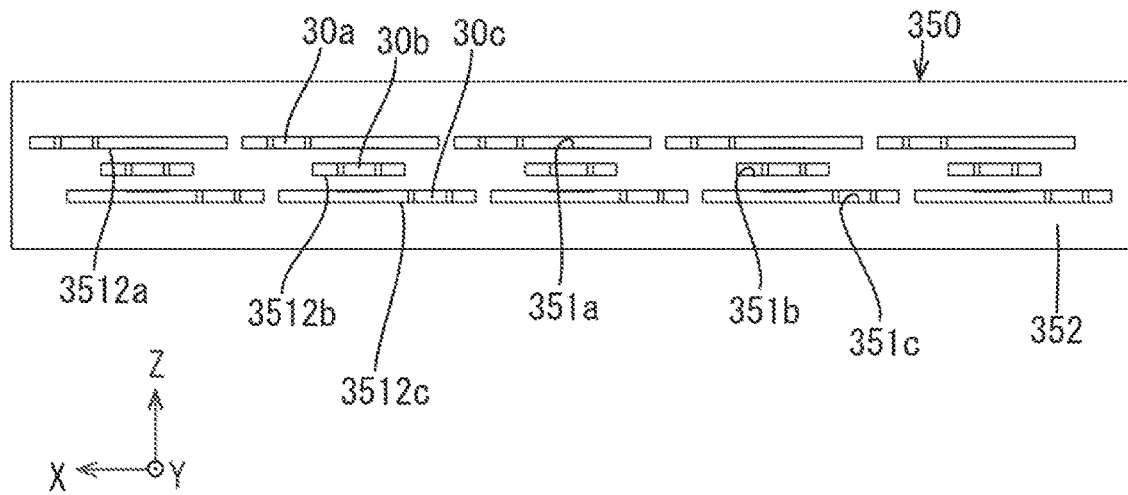
FIG. 11C is a front view of the light collecting member that is disposed on the LED board.
Figure 12:
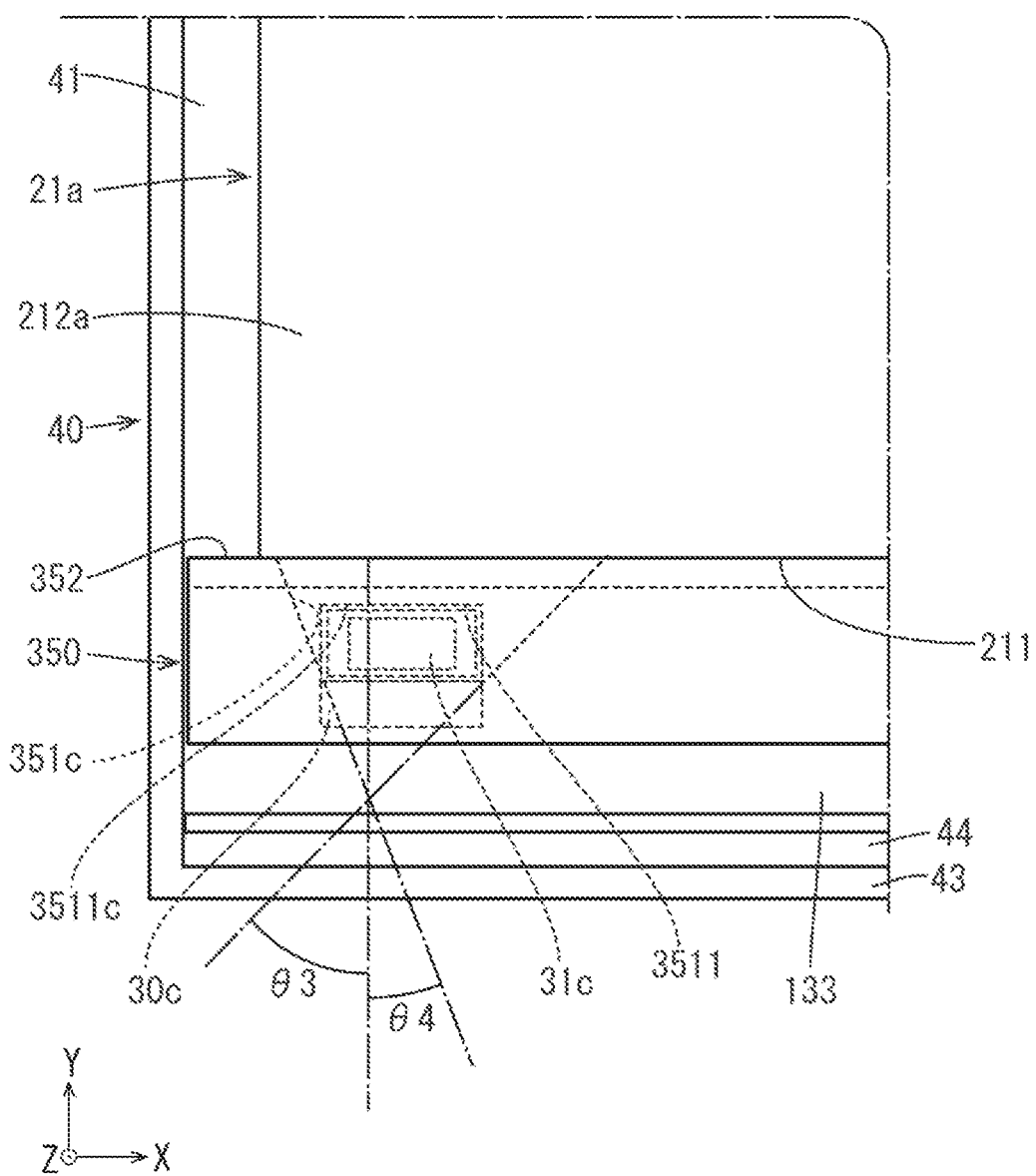
FIG. 12 is an enlarged plan view of a part of a backlight unit.

As illustrated in FIG. 11C, the hole size Increase angle is set such that the third light guide plate side hole edge section 3512c reaches a positon of the first LED 30a of the first LED row 32A with respect to the thickness direction of the light guide plate 21. However, the angle range is set such that the third light guide plate side hole edge section 3512c does not reach the adjacent third LED 30c of the third LED row 32C.

On the other hand, the first light collecting hole 351a has a configuration in which a hole size increase direction is reversed from that of the third light collecting hole 351c. Namely, the first light guide plate side hole edge section 3512a increases its hole size toward the second LED 30b of the adjacent second LED row 32B in the extending direction of the light entering edge surface 211 at a hole size increase angle that is greater than that on the opposite side (the third LED 30c side or the end side of the LED board 133). The hole size increase angle is set such that the first light guide plate side hole edge section 3512a reaches the position of the third LED 30c of the third LED row 32C in the thickness direction of the light, guide plate 21. However, the angle is set such that the first light guide plate side hole edge section 3512a does not reach the first light collecting hole 351a of the adjacent first LED 30 included in the first LED row 32A.

The second light collecting hole 351b that is between the first light collecting hole 351a and the third light colleting hole 351c has a dimension greater than that of the LED side hole edge section 3511 in the same direction and increases it hole size from the LED side hole edge section 3511 at an even angle similar to the second light collecting hole 251b of the third embodiment. The hole size increase angle is substantially same as a smaller one (θ4) of the hole size increase angles of the first light collecting hole 351a and the third light collecting hole 351c.

Furthermore, according to the present embodiment, in all of the first to third light collecting holes 351a, 351b, 351c, the light guide plate side hole edge section 3512 has a dimension in the thickness direction of the light guide plate that is smaller than those of the first to third embodiments. According to such a configuration, each of the light collecting holes 351 can be defined in independently from each other without overlapping the light collecting holes 351 included in the adjacent LED row 32. Furthermore, the light that spreads in the extending direction of the light entering edge surface 211 can be collected in the thickness direction of the light guide plate 21 by a greater amount than the above embodiments and exit effectively toward the light entering edge surface 211. In the present embodiment also, the dimension of each of the hole edge sections 3512, 3511 is set such that the light guide plate side hole edge section 3512 has a hole area or an inner area that is smaller than that of the LED side hole edge section 3511.

According to the backlight unit and the liquid crystal display device of the present embodiment, the light emitted by the LEDs 30 included in each LED row 32 can enter the light guide plate 21 through the light entering edge surface 211 with a greater area than the third embodiment. Therefore, no space or a small space is provided between the adjacent LEDs 30 (between the light guide plate side hole edge sections 3512) included in the adjacent LED rows 32 and light unevenness of the backlight unit is less likely to be caused. Therefore, display quality of the liquid crystal display device is improved and power consumption can be reduced.

Fifth Embodiment

Figure 13:
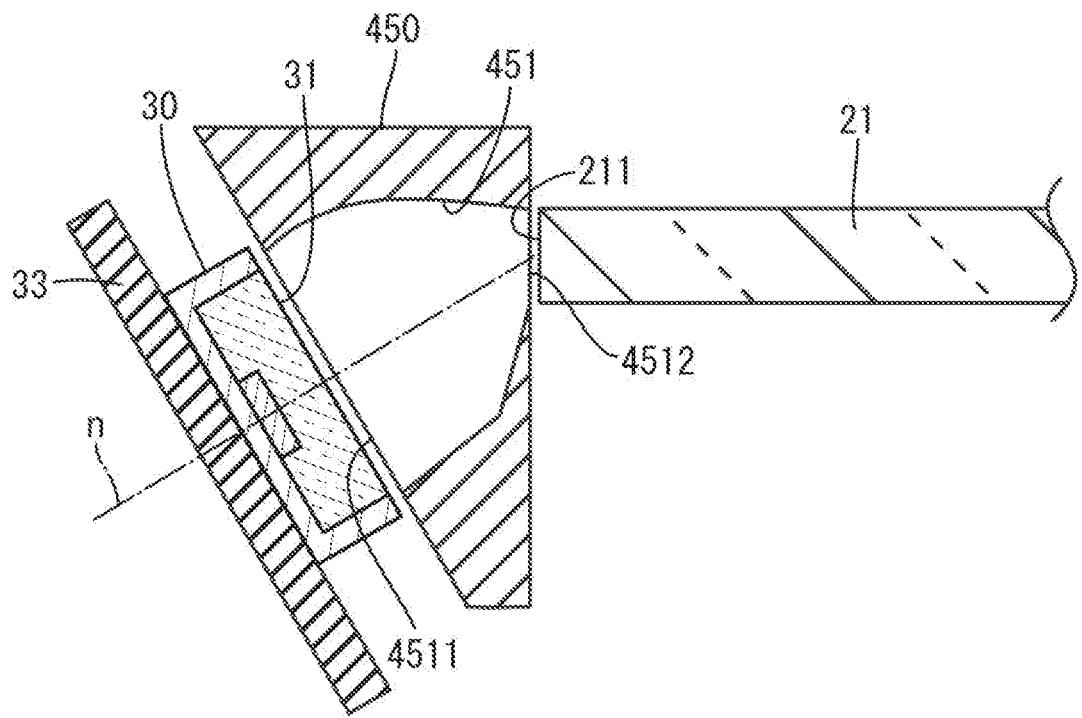
FIG. 13 is an enlarged cross-sectional view of a part of a backlight unit according to a fifth embodiment.

A fifth embodiment will be described with reference to FIG. 13. In a backlight unit and a liquid crystal display device of the present embodiment, a collecting hole 451 of a light collecting member 450 has a shape of an inner surface or a hole shape that is different from that of the first to fourth embodiments Hereinafter, configurations that are different from those of the above embodiments will be described and configurations same as those of the above embodiments are provided with the same symbols and will not be described.

In the first to fourth embodiments, the light collecting holes 51, 251, 351 have an inner surface that is along a straight line in a cross sectional view taken along an axis of each of the light collecting holes 41, 251, 351. In the present embodiment, as illustrated in FIG. 13, the light collecting hole 451 of the light collecting member 450 has an inner surface in a cross-sectional shape of a combination of an arched line and straight lines. Specifically, the cross-sectional shape of the light collecting hole 451 taken along the axis thereof includes an upper section (a light emission surface side) and a lower section. The upper section has an arched shape that projects outward gently from the light emission surface 31 of the LED 30 toward the light entering edge surface 211 of the light guide plate 21. The lower section includes a combination of straight lines that project outward gently.

The light collecting hole 451 includes a LED side hole edge section 4511 and a light guide plate side hole edge section 4512. Similar to each of the above embodiments, the LED side hole edge section 4511 has a substantially square shape that is slightly greater than that of the light emission surface 31 and is opposite the LED 30 to surround an outer periphery of the light emission surface 31 of the LED 30. Similar to each of the above embodiments, the light guide plate side hole edge section 4512 has a dimension such that a vertical dimension (in the thickness direction of the light guide plate 21) thereof is equal to or smaller than the vertical dimension of the light entering edge surface 211 and a lateral dimension (in the extending direction of the light entering edge surface 211) thereof is set no to overlap the adjacent light collecting hole 451. In the present embodiment also, an hole area or an inner area of the light guide plate side hole edge section 4512 is smaller than that of the LED side hole edge section 4511.

Further, in the present embodiment also, it is preferable to arrange the LEDs such that the line n extending from a center of the light emission surface 31 of the LED 30 vertically to the light emission surface 31 of the LED 30 overlaps a center of the light guide plate 21 in the thickness direction thereof.

The light collecting hole 451 has a cross-sectional shape that is most appropriate for directivity property of the LED 30 that is used and therefore, the light use efficiency of the LEDs 30 can be improved. By improving the light use efficiency, the power consumption can be further reduced.

Modification of Fifth Embodiment

Figure 14:
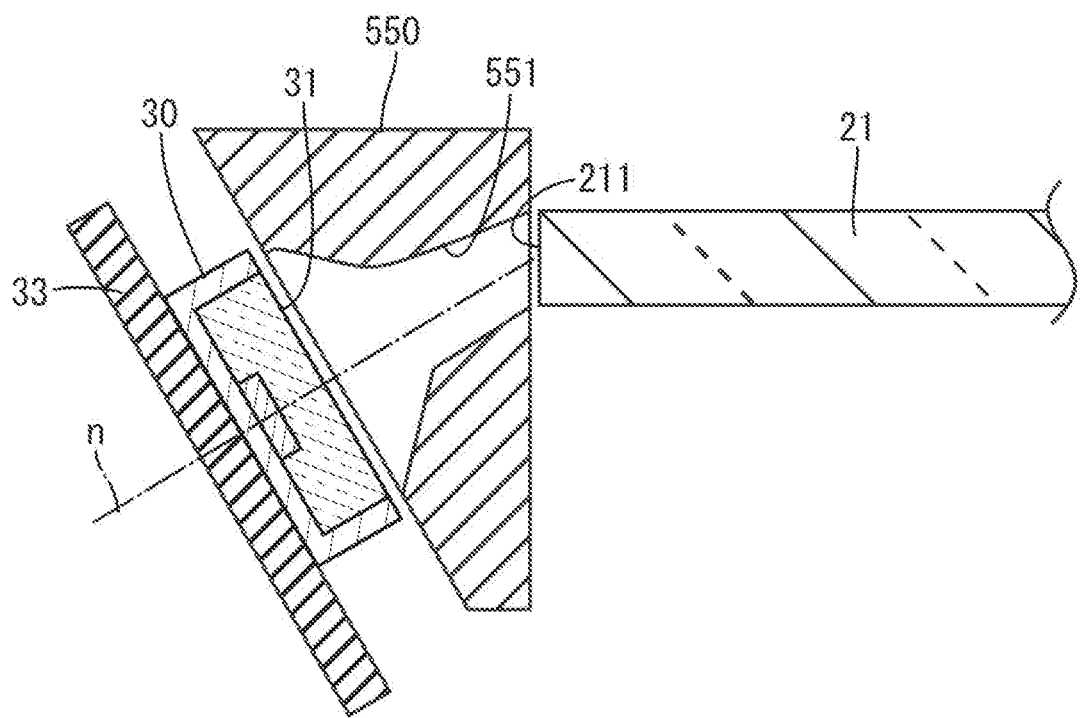
FIG. 14 is an enlarged cross-sectional view of a part of a backlight unit of a modification of the fifth embodiment.

The inner surface cross-sectional shape of the light collecting hole of the light collecting member is not necessarily limited to that of the fifth embodiment but may be altered as appropriate according to the directivity property of the LED 30. For example, as illustrated in FIG. 14, a light collecting member 550 includes a light collecting hole 551 having an inner surface a part of which extends inward.

Sixth Embodiment

Figure 15:
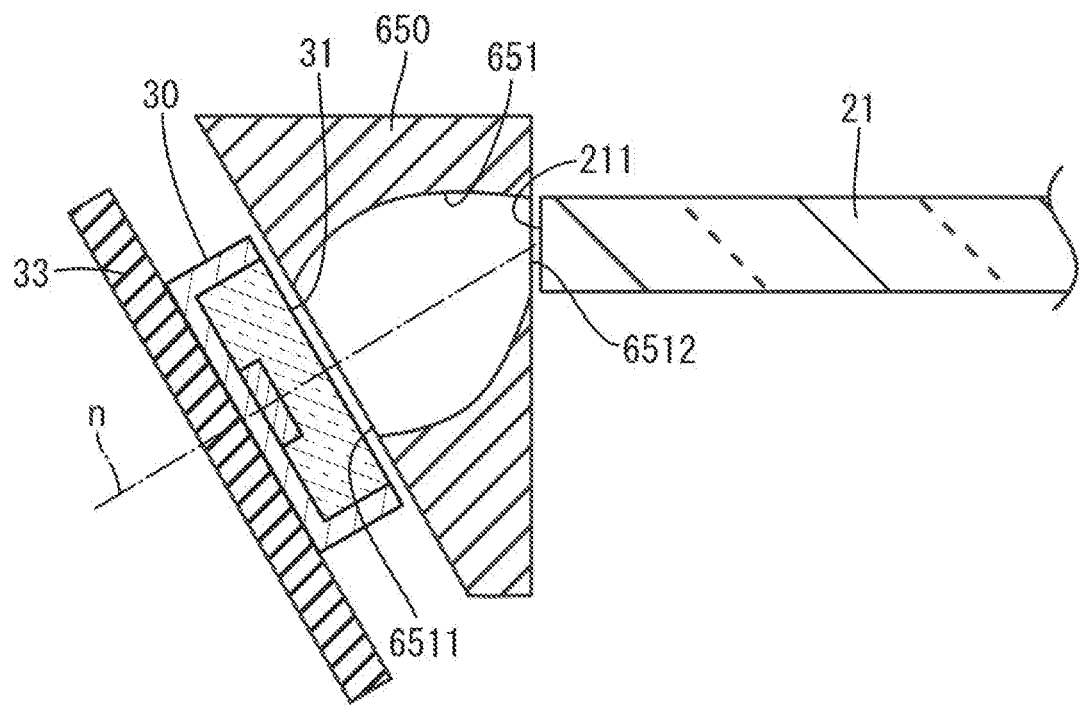
FIG. 15 is an enlarged cross-sectional view of a part of a backlight unit according to a sixth embodiment.

A sixth embodiment will be described with reference to FIG. 15. In a backlight unit and a liquid crystal display device of the present embodiment, an inner surface form of a collecting hole 651 of a light, collecting member 650 and a form of an LED side hole edge section 6511 differ from those of the first to fifth embodiments. Hereinafter, configurations that are different from those of the above embodiments will be described and configurations same as those of the above embodiments are provided with the same symbols and will not be described.

In each of the above embodiments, the LED side hole edge section of the light collecting member has a substantially square shape that is slightly greater than the light emission surface 31 and surrounds the outer periphery of the light emission surface 31 of the LED 30. However, an LED side hole edge section 6511 of the light collecting member 650 is opposite an inner section of the light emission surface 31. A light guide plate side hole edge section 6512 has a vertical dimension (in the thickness direction of the light guide plate 21) that is same as or slightly smaller than that of the light entering edge surface 211 in the same direction similar to each of the above embodiments. The light guide plate side hole edge section 6512 is inside of the upper and lower plate surfaces of the light guide plate 21. The light guide plate side hole edge section 6512 has an inner area or a hole area that is smaller than that of the LED side hole edge section 6511. The light collecting hole 651 has a cross-sectional inner surface shape that is an arched shape projecting outward.

Thus, in a configuration that the light directivity of the LEDs 30 is concentrated on a middle section of the light emission surface 31, the dimension of the LED side hole edge section 6511 of the light collecting member 650 may be equal to or smaller than that of the light emission surface 31.

Seventh Embodiment

Figure 16:
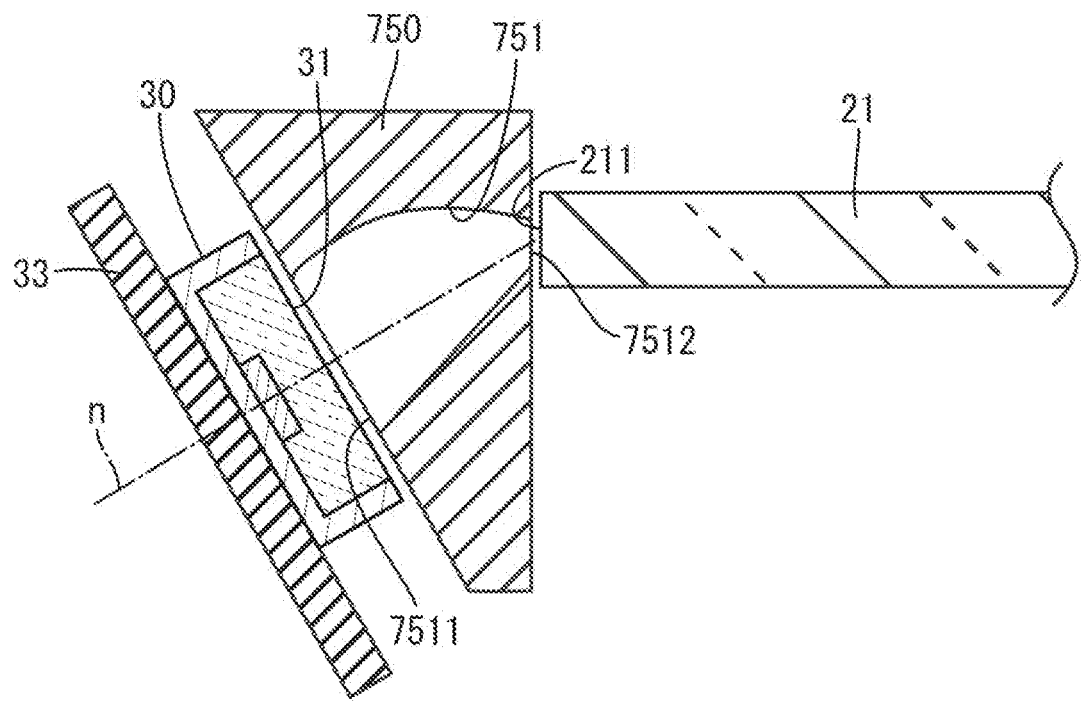
FIG. 16 is an enlarged cross-sectional view of a part of a backlight unit according to a seventh embodiment.

A seventh embodiment will be described with reference to FIG. 16. In a backlight unit and a liquid crystal display device of the present, embodiment, a collecting hole 751 of a light collecting member 750 includes a configuration (of the sixth embodiment) that an LED side hole edge section 7511 has a dimension smaller than that of the light emission surface 31 and a light guide plate side hole edge section 7512 has a dimension of about a half of the thickness dimension of the light guide plate 21. The light guide plate side hole edge section 7512 has an inner area or a hole area that is smaller than that of the LED side hole edge section 7511. The light collecting hole 751 has a cross-sectional inner surface shape such that an upper section thereof has an arched shape projecting outward and a lower section thereof is a straight line.

Thus, the light guide plate side hole edge section 7512 has a vertical dimension (a dimension in the thickness direction of the light guide plate 21) that is smaller than that of the light guide plate 21 and therefore, the light emitted by the LEDs 30 toward the light guide plate 21 is less likely to leak through a space near the plate surface of the light guide plate 21.

The technology disclosed in this specification is not limited to the embodiments described in the above and the drawings but the embodiments may be altered as appropriate.

The invention claimed is:
1. A lighting device comprising:
light sources having light emission surfaces through which light is emitted and each of the light emission surfaces having a dimension;
a light guide plate having outer peripheral edge surfaces and a light entering edge surface through which the light from the light sources enters and the light entering edge surface being a part of the outer peripheral edge surfaces, the dimension of each of the light emission surfaces being perpendicular to an arrangement direction in which the light sources are arranged and the dimension being greater than a thickness dimension of the light guide plate; and
a light collecting member between the light sources and the light entering edge surface and including light collecting holes through which the light emitted by the light sources is collected to the light entering edge surface of the light guide plate, wherein
each of the light collecting holes includes a light entrance surface being opposite the light sources and a light exit surface being opposite the light entering edge surface,
the light exit surface of the each of the light collecting holes has an area that is smaller than the area of the light entrance surface,
the light guide plate includes light guide plates and configures a light guide plate group including at least two light guide plates that are stacked on each other in the thickness direction of the light guide plate,
the light guide plate group includes the at least two light guide plates that are stacked on each other such that light entering edge surfaces thereof face a same direction,
the light sources configure light source rows corresponding to the light entering edge surfaces of the light guide plates, and
the light exit surface corresponding to one light source row of the light source rows and the light exit surface corresponding to an adjacent light source row that is adjacent to the one light source row partially overlap each other in the arrangement direction in which the light sources are arranged.

2. The lighting device according to claim 1, wherein the light exit surface is opposite an inner section of an edge of the light entering edge surface.

3. The lighting device according to claim 1, wherein the light entrance surface is opposite each of the light sources to surround each of the light emission surfaces.

4. The lighting device according to claim 1, wherein the light sources are arranged such that the light emission surfaces are inclined from a thickness direction of the light guide plate with respect to the light entering edge surface.

5. The lighting device according to claim 1, wherein the light sources and the light guide plate are arranged such that a line normal to a center of the light emission surface passes a center of the light guide plate with respect to the thickness direction thereof.

6. The lighting device according to claim 1, wherein the light source rows are mounted on a light source board.

7. The lighting device according to claim 1, wherein the light sources included in one light source row of the light source rows and the light sources included in an adjacent light source row that is adjacent to the one light source row are arranged in a staggered manner repeatedly in the arrangement direction in which the light sources are arranged.

8. The lighting device according to claim 1, wherein the light sources included in one light source row of the light source rows and the light sources included in an adjacent light source row that is adjacent to the one light source row are arranged so as not to overlap each other in the arrangement direction in which the light sources are arranged and overlap partially in a direction perpendicular to the arrangement direction in which the light sources are arranged and along the light emission surface.

9. The lighting device according to claim 1, wherein the light collecting holes corresponding to the light source rows are included in the light collecting member.

10. The lighting device according to claim 1, wherein the light collecting holes corresponding to at least one light source row of the light source rows have a same dimension from the light entrance surface to the light exit surface in the arrangement direction in which the light sources are arranged.

11. The lighting device according to claim 1, wherein the light collecting holes corresponding to at least one light source row of the light source rows have a hole dimension that increases from the light entrance surface to the light exit surface in the arrangement direction in which the light sources are arranged.

12. A display device comprising:
the lighting device according to claim 1; and
a display panel displaying an image with using light supplied by the lighting device.

* * * * *